(12) United States Patent
Fukunaga et al.

(10) Patent No.: US 11,338,887 B2
(45) Date of Patent: May 24, 2022

(54) BICYCLE REAR SPROCKET

(71) Applicant: SHIMANO INC., Sakai (JP)

(72) Inventors: Yasufumi Fukunaga, Sakai (JP); Atsuhiro Emura, Sakai (JP); Kohei Hokai, Sakai (JP)

(73) Assignee: SHIMANO INC., Sakai (JP)

( * ) Notice: Subject to any disclaimer, the term of this patent is extended or adjusted under 35 U.S.C. 154(b) by 764 days.

(21) Appl. No.: 16/282,239

(22) Filed: Feb. 21, 2019

(65) Prior Publication Data

US 2020/0269953 A1   Aug. 27, 2020

(51) Int. Cl.
*B62M 9/10* (2006.01)
*F16H 55/30* (2006.01)

(52) U.S. Cl.
CPC ............. *B62M 9/10* (2013.01); *F16H 55/30* (2013.01)

(58) Field of Classification Search
CPC ................................. F16H 55/30; B62M 9/10
USPC ........................................................ 474/160
See application file for complete search history.

(56) References Cited

U.S. PATENT DOCUMENTS

| | | | | |
|---|---|---|---|---|
| 4,174,642 A * | 11/1979 | Martin | ................... | F16H 55/30 |
| | | | | 474/152 |
| 4,392,841 A * | 7/1983 | Juy | ......................... | B62M 9/10 |
| | | | | 474/82 |
| 5,192,249 A * | 3/1993 | Nagano | ................... | B62M 9/10 |
| | | | | 474/160 |
| 5,782,712 A * | 7/1998 | Campagnolo | ........... | F16H 55/08 |
| | | | | 474/160 |
| 6,007,442 A * | 12/1999 | Schmidt | ................... | B62M 9/10 |
| | | | | 474/122 |
| 6,013,001 A * | 1/2000 | Miyoshi | ................... | B62M 9/10 |
| | | | | 474/160 |
| 6,102,821 A * | 8/2000 | Nakamura | ............... | B62M 9/10 |
| | | | | 474/160 |
| 6,139,456 A * | 10/2000 | Lii | ........................... | B62M 9/10 |
| | | | | 474/158 |
| 6,203,462 B1 * | 3/2001 | Takamori | .................. | F16H 7/06 |
| | | | | 474/160 |
| 6,666,786 B2 * | 12/2003 | Yahata | ................... | B62M 9/105 |
| | | | | 474/158 |
| 6,923,741 B2 * | 8/2005 | Wei | .......................... | B62M 9/10 |
| | | | | 474/160 |
| 8,696,503 B2 * | 4/2014 | Oishi | ....................... | B62M 9/10 |
| | | | | 474/160 |

(Continued)

*Primary Examiner* — Henry Y Liu
(74) *Attorney, Agent, or Firm* — Mori & Ward, LLP

(57) ABSTRACT

A bicycle rear sprocket comprises a sprocket body and a plurality of sprocket teeth including a plurality of driving-noise reduction teeth. Each of the plurality of driving-noise reduction teeth comprises an upstream circumferential surface, a downstream circumferential surface, a first chamfer, and a second chamfer. The first chamfer has a first borderline relative to the bicycle outward surface. The second chamfer has a second borderline relative to the bicycle outward surface. A first opposite end of the first borderline and a second opposite end of the second borderline are disposed radially outwardly from each of a first end of the first borderline and a second end of the second borderline with respect to the rotational center axis. A total number of the plurality of driving-noise reduction teeth is equal to or larger than one-third of a total tooth-space number of the plurality of sprocket teeth.

19 Claims, 31 Drawing Sheets

(56) References Cited

U.S. PATENT DOCUMENTS

| | | | | |
|---|---|---|---|---|
| 8,956,254 | B2* | 2/2015 | Tokuyama | B62M 9/12 |
| | | | | 474/160 |
| 8,968,130 | B2* | 3/2015 | Liao | B62M 9/10 |
| | | | | 474/160 |
| 9,394,986 | B2* | 7/2016 | Pfeiffer | F16H 55/30 |
| 9,873,481 | B2* | 1/2018 | Braedt | B62M 9/10 |
| 10,295,041 | B2* | 5/2019 | Akanishi | F16H 55/30 |
| 2002/0086753 | A1* | 7/2002 | Yahata | B62M 9/105 |
| | | | | 474/160 |
| 2009/0069135 | A1* | 3/2009 | Chiang | B62M 9/105 |
| | | | | 474/164 |
| 2015/0226305 | A1* | 8/2015 | Pfeiffer | B62M 9/105 |
| | | | | 474/152 |
| 2018/0180157 | A1* | 6/2018 | Akanishi | B62M 9/12 |
| 2018/0290712 | A1* | 10/2018 | Taniguchi | F16H 55/30 |
| 2018/0363752 | A1* | 12/2018 | Chin | B62M 9/00 |
| 2020/0166114 | A1* | 5/2020 | Staples | B62M 9/02 |

* cited by examiner

BICYCLE REAR SPROCKET

BACKGROUND OF THE INVENTION

Field of the Invention

The present invention relates to a bicycle rear sprocket.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle sprocket.

SUMMARY OF THE INVENTION

In accordance with a first aspect of the present invention, a bicycle rear sprocket comprises a sprocket body and a plurality of sprocket teeth extending radially outwardly from the sprocket body with respect to a rotational center axis of the bicycle rear sprocket. The sprocket body and the plurality of sprocket teeth define a bicycle outward surface and a bicycle inward surface reversely facing relative to the bicycle outward surface in an axial direction with respect to the rotational center axis. The bicycle inward surface is configured to face toward a center plane of a bicycle frame in a mounting state where the bicycle rear sprocket is mounted to the bicycle frame. The plurality of sprocket teeth includes a plurality of driving-noise reduction teeth. Each of the plurality of driving-noise reduction teeth comprises an upstream circumferential surface, a downstream circumferential surface, a first chamfer, and a second chamfer. The downstream circumferential surface reversely faces relative to the upstream circumferential surface in a circumferential direction with respect to the rotational center axis. The first chamfer extends from the upstream circumferential surface toward the bicycle outward surface. The first chamfer has a first borderline relative to the bicycle outward surface. The first borderline has a first end disposed on the upstream circumferential surface and a first opposite end opposite to the first end. The second chamfer extends from the downstream circumferential surface toward the bicycle outward surface. The second chamfer has a second borderline relative to the bicycle outward surface. The second borderline has a second end disposed on the downstream circumferential surface and a second opposite end opposite to the second end. The first opposite end of the first borderline and the second opposite end of the second borderline are disposed radially outwardly from each of the first end of the first borderline and the second end of the second borderline with respect to the rotational center axis. A total number of the plurality of driving-noise reduction teeth is equal to or larger than one-third of a total tooth-space number of the plurality of sprocket teeth.

With the bicycle rear sprocket according to the first aspect, at least one of the first chamfer and the second chamfer can achieve a smooth shifting operation in which a bicycle chain is shifted between the bicycle rear sprocket and a neighboring rear sprocket with keeping strength of the bicycle rear sprocket. Furthermore, at least one of the first chamfer and the second chamfer can reduce noise caused by a contact between the bicycle chain and the bicycle rear sprocket in a state where the bicycle chain is engaged with a neighboring rear sprocket and inclined relative to the center plane of the bicycle frame to gradually increase or decrease a distance between the bicycle chain and the center plane in an axial direction with respect to a rotational center axis of the bicycle rear sprocket from the neighboring rear sprocket to a front sprocket.

In accordance with a second aspect of the present invention, the bicycle rear sprocket according to the first aspect is configured so that the total tooth-space number of the plurality of sprocket teeth ranges from 9 to 18.

With the bicycle rear sprocket according to the second aspect, at least one of the first chamfer and the second chamfer can reduce noise caused by a contact between the bicycle chain and the bicycle rear sprocket in a state where the bicycle chain is engaged with a neighboring smaller rear sprocket and inclined relative to the center plane of the bicycle frame to gradually decrease the distance between the bicycle chain and the center plane in an axial direction with respect to a rotational center axis of the bicycle rear sprocket from the neighboring rear sprocket to a front sprocket.

In accordance with a third aspect of the present invention, the bicycle rear sprocket according to the first or second aspect is configured so that the total number of the plurality of driving-noise reduction teeth is equal to or larger than three.

With the bicycle rear sprocket according to the third aspect, at least one of the first chamfer and the second chamfer can effectively reduce noise caused by a contact between the bicycle chain and the bicycle rear sprocket in the state where the bicycle chain is engaged with the neighboring rear sprocket and inclined relative to the center plane of the bicycle frame to gradually increase or decrease the distance between the bicycle chain and the center plane in an axial direction with respect to a rotational center axis of the bicycle rear sprocket from the neighboring rear sprocket to the front sprocket.

In accordance with a fourth aspect of the present invention, the bicycle rear sprocket according to any one of the first to third aspects is configured so that the total number of the plurality of driving-noise reduction teeth is equal to or smaller than 16.

With the bicycle rear sprocket according to the fourth aspect, it is possible to improve flexibility of design such as arrangement of a shifting facilitation tooth.

In accordance with a fifth aspect of the present invention, the bicycle rear sprocket according to any one of the first to fourth aspects is configured so that the plurality of sprocket teeth includes at least one upshifting facilitation tooth configured to facilitate an upshifting operation in which a bicycle chain is shifted from the bicycle rear sprocket toward a neighboring smaller rear sprocket.

With the bicycle rear sprocket according to the fifth aspect, the at least one upshifting facilitation tooth can achieve a smooth upshifting operation.

In accordance with a sixth aspect of the present invention, the bicycle rear sprocket according to the fifth aspect is configured so that the at least one upshifting facilitation tooth includes at least one axially recessed tooth.

With the bicycle rear sprocket according to the sixth aspect, the at least one axially recessed tooth can reduce interference between the bicycle chain and the bicycle rear sprocket in the upshifting operation.

In accordance with a seventh aspect of the present invention, the bicycle rear sprocket according to any one of the first to sixth aspects is configured so that the plurality of sprocket teeth includes at least one downshifting facilitation tooth configured to facilitate a downshifting operation in which a bicycle chain is shifted from a neighboring smaller rear sprocket toward the bicycle rear sprocket.

With the bicycle rear sprocket according to the seventh aspect, the at least one downshifting facilitation tooth can achieve a smooth downshifting operation.

In accordance with an eighth aspect of the present invention, the bicycle rear sprocket according to the seventh aspect is configured so that the at least one downshifting facilitation tooth includes at least one axially recessed tooth.

With the bicycle rear sprocket according to the eighth aspect, the at least one axially recessed tooth can reduce interference between the bicycle chain and the bicycle rear sprocket in the downshifting operation.

In accordance with a ninth aspect of the present invention, a bicycle rear sprocket comprises a sprocket body and a plurality of sprocket teeth extending radially outwardly from the sprocket body with respect to a rotational center axis of the bicycle rear sprocket. The sprocket body and the plurality of sprocket teeth define a bicycle outward surface and a bicycle inward surface reversely facing relative to the bicycle outward surface in an axial direction with respect to the rotational center axis. The bicycle inward surface is configured to face toward a center plane of a bicycle frame in a mounting state where the bicycle rear sprocket is mounted to the bicycle frame. The plurality of sprocket teeth includes a plurality of chain-drop reduction teeth. Each of the plurality of chain-drop reduction teeth comprises an upstream circumferential surface, a downstream circumferential surface, a tooth-tip, and a chain-drop reduction chamfer. The downstream circumferential surface reversely faces relative to the upstream circumferential surface in a circumferential direction with respect to the rotational center axis. The chain-drop reduction chamfer extends from the upstream circumferential surface and from the tooth-tip toward at least one of the bicycle inward surface and the bicycle outward surface. The chain-drop reduction chamfer defines a minimum tooth-tip axial length that is equal to or smaller than 0.3 mm. A total number of the plurality of chain-drop reduction teeth is equal to or larger than one-third of a total tooth-space number of the plurality of sprocket teeth.

With the bicycle rear sprocket according to the ninth aspect, the chain-drop reduction chamfer can suppress a chain-drop of a bicycle chain from the bicycle rear sprocket when the bicycle rear sprocket reversely rotates.

In accordance with a tenth aspect of the present invention, the bicycle rear sprocket according to the ninth aspect is configured so that the chain-drop reduction chamfer extends toward the bicycle inward surface.

With the bicycle rear sprocket according to the tenth aspect, the chain-drop reduction chamfer can suppress the chain-drop when the bicycle rear sprocket reversely rotates in a state where the bicycle chain is engaged with the bicycle rear sprocket and inclined relative to the center plane of the bicycle frame to gradually increase or decrease the distance between the bicycle chain and the center plane in an axial direction with respect to a rotational center axis of the bicycle rear sprocket from the bicycle rear sprocket to a front sprocket.

In accordance with an eleventh aspect of the present invention, the bicycle rear sprocket according to the ninth or tenth aspect is configured so that the total tooth-space number of the plurality of sprocket teeth is equal to or larger than 21.

With the bicycle rear sprocket according to the eleventh aspect, the chain-drop reduction chamfer can suppress the chain-drop when the bicycle rear sprocket reversely rotates in a state where the bicycle chain is engaged with the bicycle rear sprocket and inclined relative to the center plane of the bicycle frame to gradually increase the distance between the bicycle chain and the center plane in an axial direction with respect to a rotational center axis of the bicycle rear sprocket from the bicycle rear sprocket to a front sprocket.

In accordance with a twelfth aspect of the present invention, the bicycle rear sprocket according to any one of the ninth to eleventh aspects is configured so that the total tooth-space number of the plurality of sprocket teeth is equal to or smaller than 58.

With the bicycle rear sprocket according to the twelfth aspect, the chain-drop reduction chamfer can effectively suppress the chain-drop when the bicycle rear sprocket reversely rotates in a state where the bicycle chain is engaged with the bicycle rear sprocket and inclined relative to the center plane of the bicycle frame to gradually increase the distance between the bicycle chain and the center plane in an axial direction with respect to a rotational center axis of the bicycle rear sprocket from the bicycle rear sprocket to a front sprocket.

In accordance with a thirteenth aspect of the present invention, the bicycle rear sprocket according to any one of the ninth to twelfth aspects is configured so that the total number of the plurality of chain-drop reduction teeth is equal to or larger than three.

With the bicycle rear sprocket according to the thirteenth aspect, the chain-drop reduction chamfer can effectively suppress the chain-drop when the bicycle rear sprocket reversely rotates in a state where the bicycle chain is engaged with the bicycle rear sprocket and inclined relative to the center plane of the bicycle frame to gradually increase the distance between the bicycle chain and the center plane in an axial direction with respect to a rotational center axis of the bicycle rear sprocket from the bicycle rear sprocket to a front sprocket.

In accordance with a fourteenth aspect of the present invention, the bicycle rear sprocket according to any one of the ninth to thirteenth aspects is configured so that the total number of the plurality of chain-drop reduction teeth is equal to or smaller than 55.

With the bicycle rear sprocket according to the fourteenth aspect, the chain-drop reduction chamfer can effectively suppress the chain-drop when the bicycle rear sprocket reversely rotates.

In accordance with a fifteenth aspect of the present invention, the bicycle rear sprocket according to any one of the ninth to fourteenth aspects is configured so that the minimum tooth-tip axial length is equal to or larger than 0.15 mm.

With the bicycle rear sprocket according to the fourteenth aspect, it is possible to ensure the strength of the chain-drop reduction tooth.

In accordance with a sixteenth aspect of the present invention, the bicycle rear sprocket according to any one of the ninth to fifteenth aspects is configured so that the plurality of sprocket teeth includes at least one upshifting facilitation tooth configured to facilitate an upshifting operation in which a bicycle chain is shifted from the bicycle rear sprocket toward a neighboring smaller rear sprocket.

With the bicycle rear sprocket according to the sixteenth aspect, the at least one upshifting facilitation tooth can achieve a smooth upshifting operation.

In accordance with a seventeenth aspect of the present invention, the bicycle rear sprocket according to the sixteenth aspect is configured so that the at least one upshifting facilitation tooth includes at least one axially recessed tooth.

With the bicycle rear sprocket according to the seventeenth aspect, the at least one axially recessed tooth can reduce interference between the bicycle chain and the bicycle rear sprocket in the upshifting operation.

In accordance with an eighteenth aspect of the present invention, the bicycle rear sprocket according to any one of the ninth to seventeenth aspects is configured so that the plurality of sprocket teeth includes at least one downshifting facilitation tooth configured to facilitate a downshifting operation in which a bicycle chain is shifted from a neighboring smaller rear sprocket toward the bicycle rear sprocket.

With the bicycle rear sprocket according to the eighteenth aspect, the at least one downshifting facilitation tooth can achieve a smooth downshifting operation.

In accordance with a nineteenth aspect of the present invention, the bicycle rear sprocket according to the eighteenth aspect is configured so that the at least one downshifting facilitation tooth includes at least one axially recessed tooth.

With the bicycle rear sprocket according to the nineteenth aspect, the at least one axially recessed tooth can reduce interference between the bicycle chain and the bicycle rear sprocket in the downshifting operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
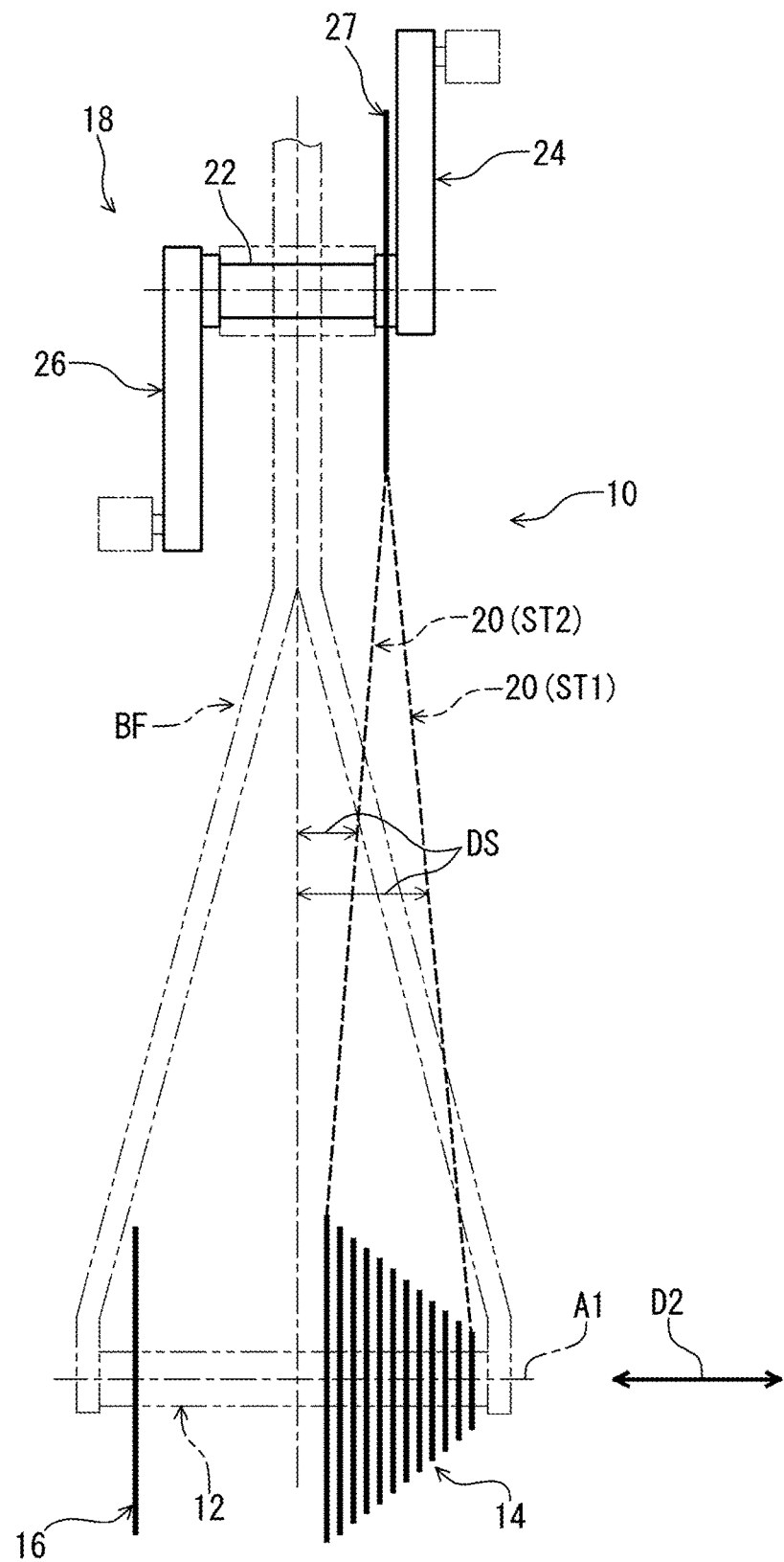
FIG. 1 is a schematic diagram of a bicycle including a bicycle rear sprocket in accordance with an embodiment.

The embodiment(s) will now be described with reference to the accompanying drawings, wherein like reference numerals designate corresponding or identical elements throughout the various drawings.

Referring initially to FIG. 1, a bicycle drive train 10 comprises a bicycle rear hub assembly 12 and a bicycle sprocket arrangement 14. The bicycle rear hub assembly 12 is secured to a bicycle frame BF. The bicycle sprocket arrangement 14 is mounted on the bicycle rear hub assembly 12. A disc brake rotor 16 is mounted on the bicycle rear hub assembly 12.

The bicycle drive train 10 further comprises a crank assembly 18 and a bicycle chain 20. The crank assembly 18 includes a crank axle 22, a right crank arm 24, a left crank arm 26, and a front sprocket 27. The right crank arm 24 and the left crank arm 26 are secured to the crank axle 22. The front sprocket 27 is secured to at least one of the crank axle 22 and the right crank arm 24. The bicycle chain 20 is engaged with the front sprocket 27 and the bicycle sprocket arrangement 14 to transmit a pedaling force from the front sprocket 27 to the bicycle sprocket arrangement 14. The crank assembly 18 includes the front sprocket 27 as a single sprocket in the illustrated embodiment. However, the crank assembly 18 can include a plurality of front sprockets. The bicycle sprocket arrangement 14 is a rear sprocket assembly.

However, structures of the bicycle sprocket arrangement 14 can be applied to the front sprocket.

In the present application, the following directional terms "front," "rear," "forward," "rearward," "left," "right," "transverse," "upward" and "downward" as well as any other similar directional taints refer to those directions which are determined on the basis of a user (e.g., a rider) who sits on a saddle (not shown) of a bicycle with facing a handlebar (not shown). Accordingly, these terms, as utilized to describe the bicycle sprocket arrangement 14, should be interpreted relative to the bicycle equipped with the bicycle sprocket arrangement 14 as used in an upright riding position on a horizontal surface.

Figure 2:
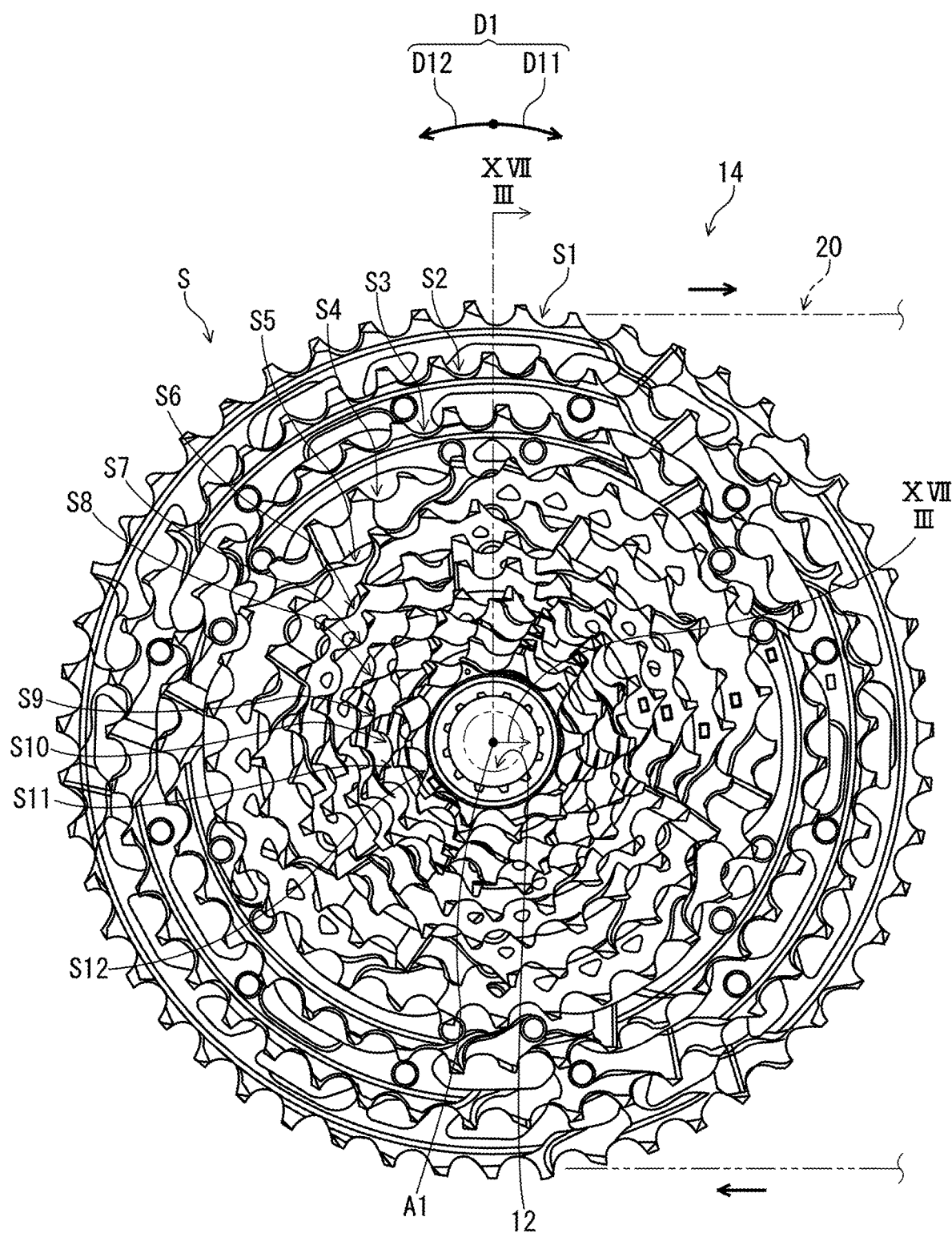
FIG. 2 is a side elevational view of a bicycle sprocket arrangement of the bicycle illustrated in FIG. 1.

As seen in FIG. 2, the bicycle sprocket arrangement 14 has a rotational center axis A1. The bicycle sprocket arrangement 14 is rotatably supported by the bicycle rear hub assembly 12 relative to the bicycle frame BF (FIG. 1) about the rotational center axis A1. The bicycle sprocket arrangement 14 is configured to be engaged with the bicycle chain 20 to transmit a driving rotational force F1 between the bicycle chain 20 and the bicycle sprocket arrangement 14 during pedaling. The bicycle sprocket arrangement 14 is rotated about the rotational center axis A1 in a driving rotational direction D11 during pedaling. The driving rotational direction D11 is defined along a circumferential direction D1 of the bicycle rear hub assembly 12 or the bicycle sprocket arrangement 14. A reverse rotational direction D12 is an opposite direction of the driving rotational direction D11 and is defined along the circumferential direction D1.

Figure 3:
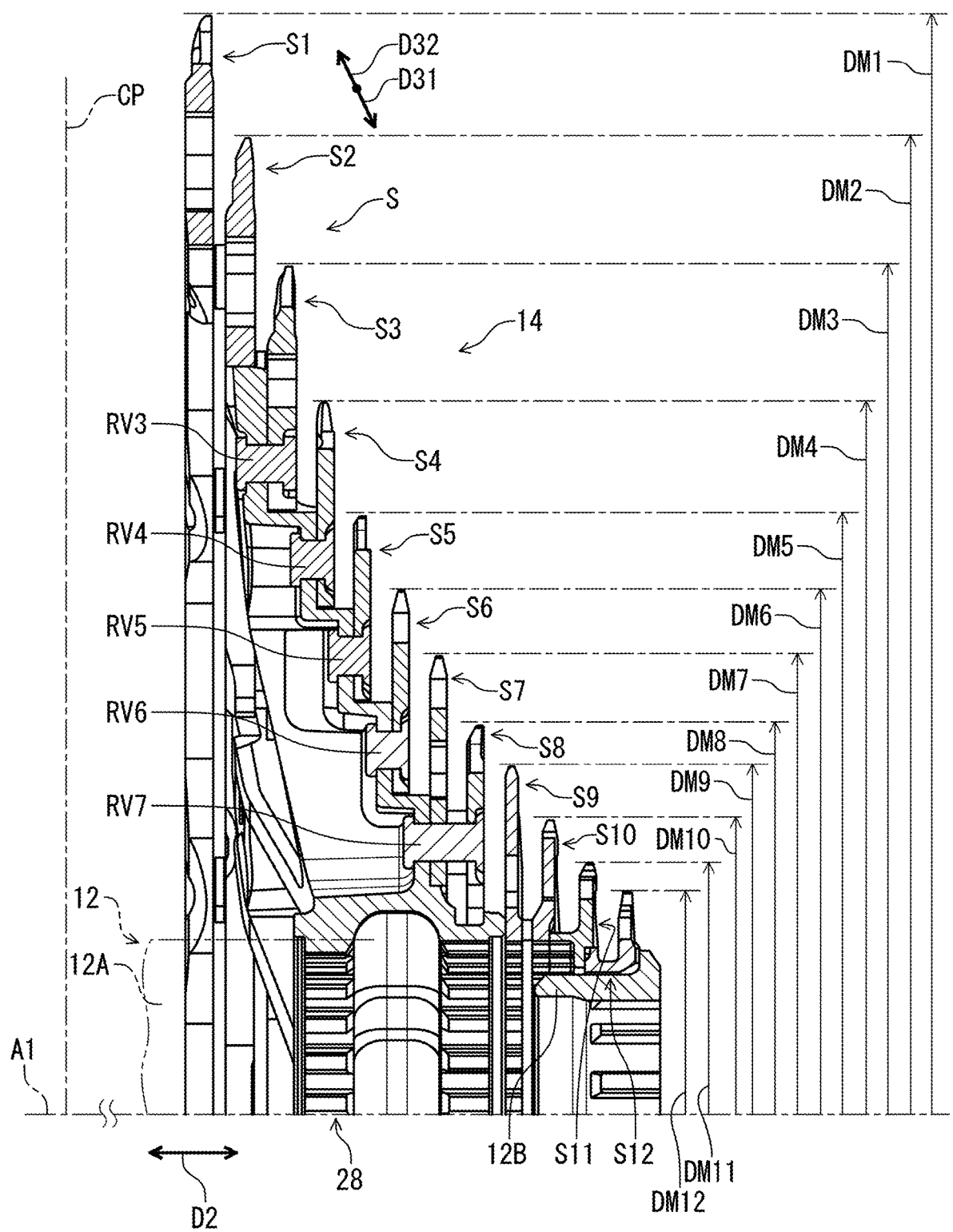
FIG. 3 is a cross-sectional view of the bicycle sprocket arrangement taken along line III-III of FIG. 2.

As seen in FIG. 3, the bicycle sprocket arrangement 14 comprises a plurality of bicycle rear sprockets S. In this embodiment, the plurality of bicycle rear sprockets S includes bicycle rear sprockets S1 to S12. Each of the bicycle rear sprockets S1 to S12 has the rotational center axis A1. The bicycle rear sprockets S1 to S12 are arranged in this order in an axial direction D2 with respect to the rotational center axis A1 of the bicycle sprocket arrangement 14. However, the total number of the plurality of bicycle rear sprockets S is not limited to this embodiment.

For example, upshifting occurs when the bicycle chain 20 is shifted from a sprocket to a neighboring smaller sprocket in an upshifting direction D31. Downshifting occurs when the bicycle chain 20 is shifted from a sprocket to a neighboring larger sprocket in a downshifting direction D32.

In this embodiment, the bicycle rear sprockets S1 to S12 are separate members from each other. However, at least one of the bicycle rear sprockets S1 to S12 can be integrally provided with another of the bicycle rear sprockets S1 to S12 as a one-piece unitary member. The bicycle sprocket arrangement 14 can be a one-piece unitary member. Alternatively, at least one of the bicycle rear sprockets S1 to S12 can be integrally provided with another of the bicycle rear sprockets S1 to S12 by adhesive or fasteners such as rivets.

The bicycle rear sprocket S1 has an outer diameter DM1 having the rotational center axis A1 as a center. The bicycle rear sprocket S2 has an outer diameter DM2 having the rotational center axis A1 as a center. The bicycle rear sprocket S3 has an outer diameter DM3 having the rotational center axis A1 as a center. The bicycle rear sprocket S4 has an outer diameter DM4 having the rotational center axis A1 as a center. The bicycle rear sprocket S5 has an outer diameter DM5 having the rotational center axis A1 as a center. The bicycle rear sprocket S6 has an outer diameter DM6 having the rotational center axis A1 as a center. The bicycle rear sprocket S7 has an outer diameter DM7 having the rotational center axis A1 as a center. The bicycle rear sprocket S8 has an outer diameter DM8 having the rotational center axis A1 as a center. The bicycle rear sprocket S9 has an outer diameter DM9 having the rotational center axis A1 as a center. The bicycle rear sprocket S10 has an outer diameter DM10 having the rotational center axis A1 as a center. The bicycle rear sprocket S11 has an outer diameter DM11 having the rotational center axis A1 as a center. The bicycle rear sprocket S12 has an outer diameter DM12 having the rotational center axis A1 as a center. In this embodiment, the outer diameter DM1 is the largest outer diameter in the bicycle sprocket arrangement 14. The outer diameter DM12 is the smallest outer diameter in the bicycle sprocket arrangement 14.

Figure 4:
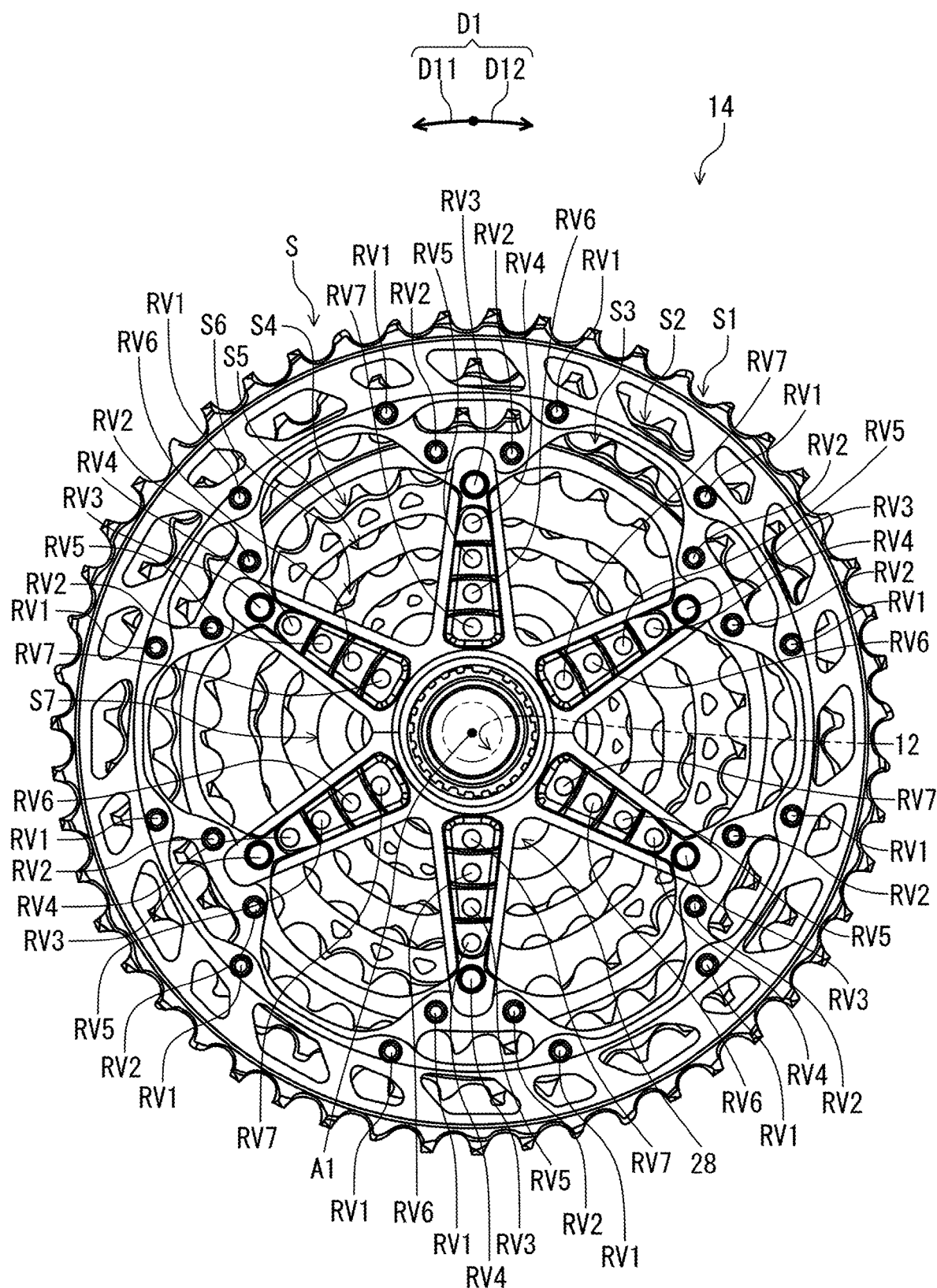
FIG. 4 is another side elevational view of a bicycle sprocket arrangement of the bicycle illustrated in FIG. 1.

As seen in FIGS. 3 and 4, the bicycle sprocket arrangement 14 comprises a sprocket carrier 28. The bicycle rear sprocket S3 is secured to the sprocket carrier 28 with a plurality of rivets RV3. The bicycle rear sprocket S4 is secured to the sprocket carrier 28 with a plurality of rivets RV4. The bicycle rear sprocket S5 is secured to the sprocket carrier 28 with a plurality of rivets RV5. The bicycle rear sprocket S6 is secured to the sprocket carrier 28 with a plurality of rivets RV6. The bicycle rear sprockets S7 and S8 is secured to the sprocket carrier 28 with a plurality of rivets RV7. As seen in FIG. 4, the bicycle rear sprocket S2 is secured to the bicycle rear sprocket S3 with a plurality of rivets RV2. The bicycle rear sprocket S1 is secured to the bicycle rear sprocket S2 with a plurality of rivets RV1. As seen in FIG. 3, an internal spline of the sprocket carrier 28 is engaged with an external spline of a sprocket support body 12A of the bicycle rear hub assembly 12. The bicycle rear sprockets S9 to S12 are held between the sprocket carrier 28 and a securing member 12B of the bicycle rear hub assembly 12. The sprocket carrier 28 can be omitted if the bicycle rear sprockets S1 to S8 are integrally formed with each other as a one-piece unitary member or if the bicycle rear sprockets S1 to S8 are directly secured to each other by e.g. at least one of adhesive and a plurality of mechanical fasteners.

Figure 5:
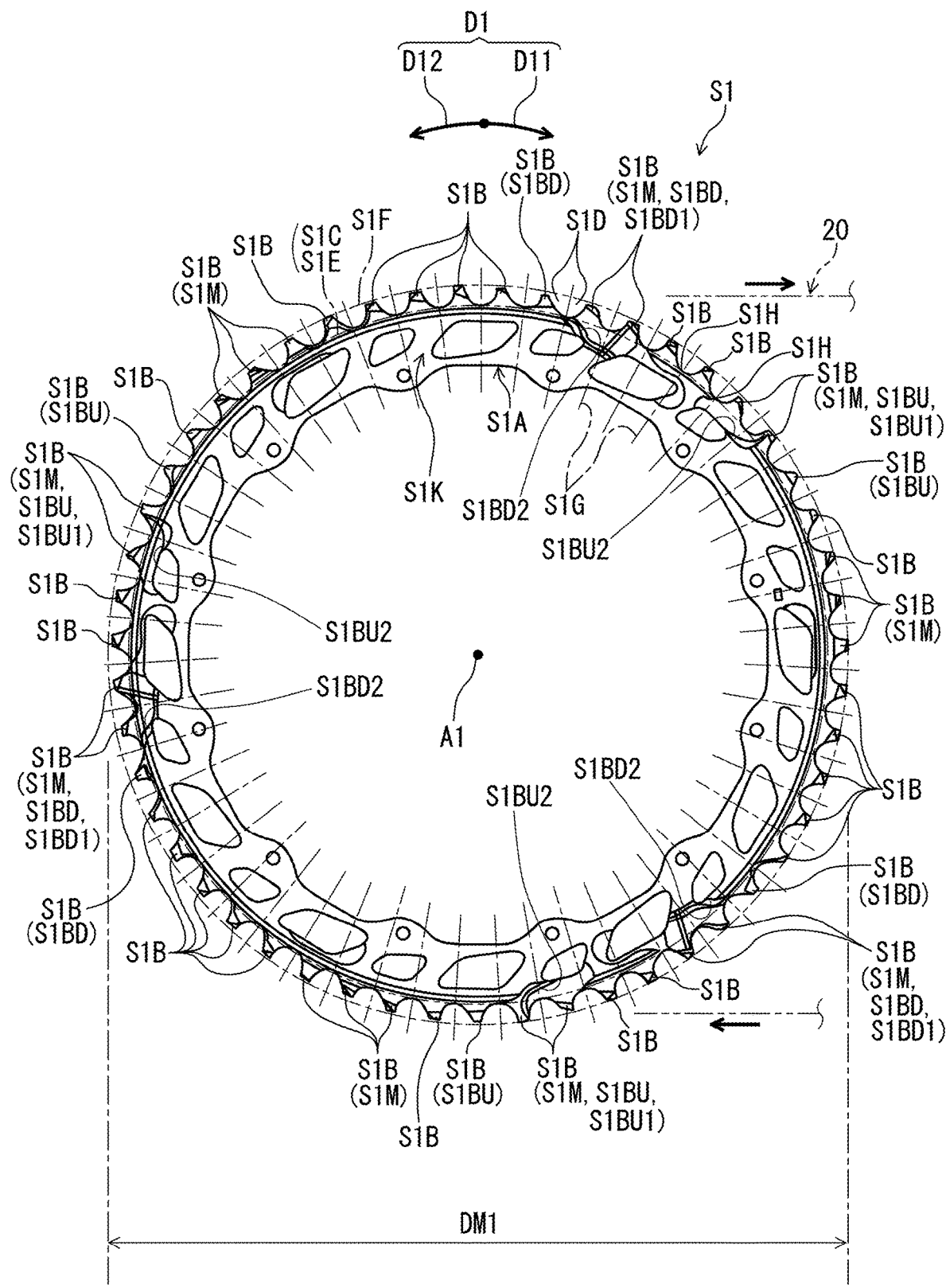
FIG. 5 is a side elevational view of a bicycle rear sprocket of the bicycle sprocket arrangement illustrated in FIG. 2.

As seen in FIG. 5, the bicycle rear sprocket S1 comprises a sprocket body S1A and a plurality of sprocket teeth S1B. The plurality of sprocket teeth S1B extends radially outwardly from the sprocket body S1A with respect to the rotational center axis A1 of the bicycle rear sprocket S1. The plurality of sprocket teeth S1B is provided on an outer periphery S1C of the sprocket body S1A. The outer diameter DM1 is defined by at least one tooth of the plurality of sprocket teeth S1B with respect to the rotational center axis A1.

For example, the bicycle rear sprocket S1 includes a plurality of tooth-spaces S1D. The plurality of tooth-spaces S1D is provided radially outwardly of the sprocket body S1A and arranged at an equal pitch in the circumferential direction D1. The sprocket teeth S1B are respectively disposed in the tooth-spaces S1D when viewed along the rotational center axis A1.

The tooth-space S1D is defined by a root circle S1E, an outer diameter circle S1F, and adjacent two radial lines S1G as viewed along the rotational center axis A1. The root circle S1B is defined by a plurality of tooth bottoms S1H provided on the outer periphery S1C. The outer diameter circle S1F has the outer diameter DM1. The radial line S1G extends radially outwardly from the rotational center axis A1 through the tooth bottom S1H. Each of the plurality of tooth-spaces S1D has the same shape.

In this embodiment, the bicycle rear sprocket S1 has a total tooth-space number. The total tooth-space number is a total number of the tooth-spaces S1D of the bicycle rear sprocket S1. The total tooth-space number of the bicycle rear sprocket S1 is S1, and the total number of the sprocket teeth S1B is S1. Namely, the total tooth-space number is equal to the total number of the sprocket teeth S1B in the bicycle rear sprocket S1. However, the total tooth-space number can be different from the total number of the sprocket teeth S1B in the bicycle rear sprocket S1. For example, at least one of the sprocket teeth S1B can be omitted from the bicycle rear sprocket S1. In such embodiments, the total number of the plurality of sprocket teeth S1B decreases while the total tooth-space number of the bicycle rear sprocket S1 is constant.

Figure 6:
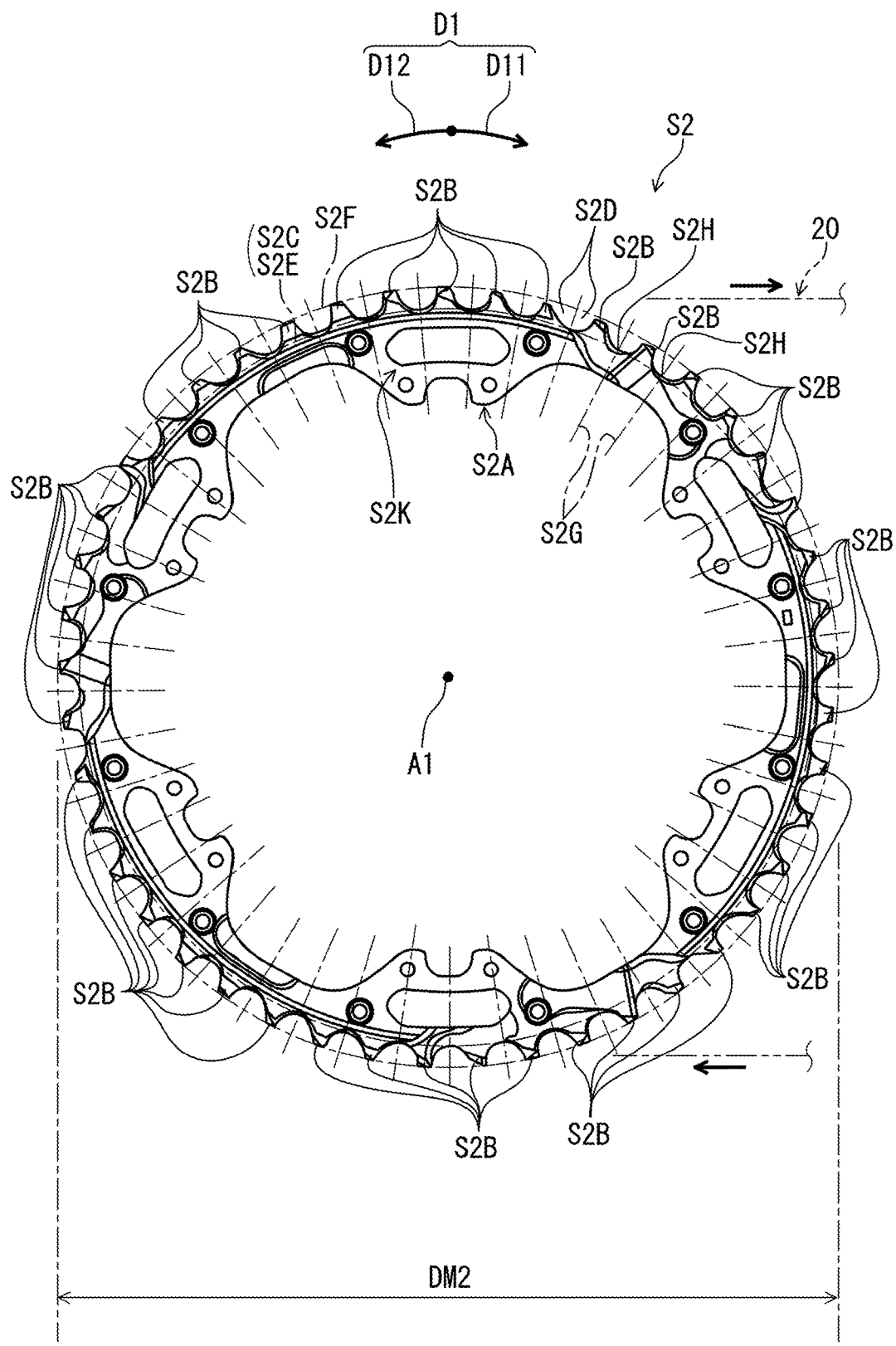
FIG. 6 is a side elevational view of a bicycle rear sprocket of the bicycle sprocket arrangement illustrated in FIG. 2.

As seen in FIG. 6, the bicycle rear sprocket S2 comprises a sprocket body S2A, a plurality of sprocket teeth S2B, an outer periphery S2C, a plurality of tooth-spaces S2D, a root circle S2E, an outer diameter circle S2F, a plurality of radial lines S2G, and a plurality of tooth bottoms S2H. A total tooth-space number of the bicycle rear sprocket S2 is 45, and the total number of the sprocket teeth S2B is 45. The above description regarding the structure of the bicycle rear sprocket S1 can apply to the bicycle rear sprocket S2 by replacing at least partly the reference numeral "S1" with "S2."

Figure 7:
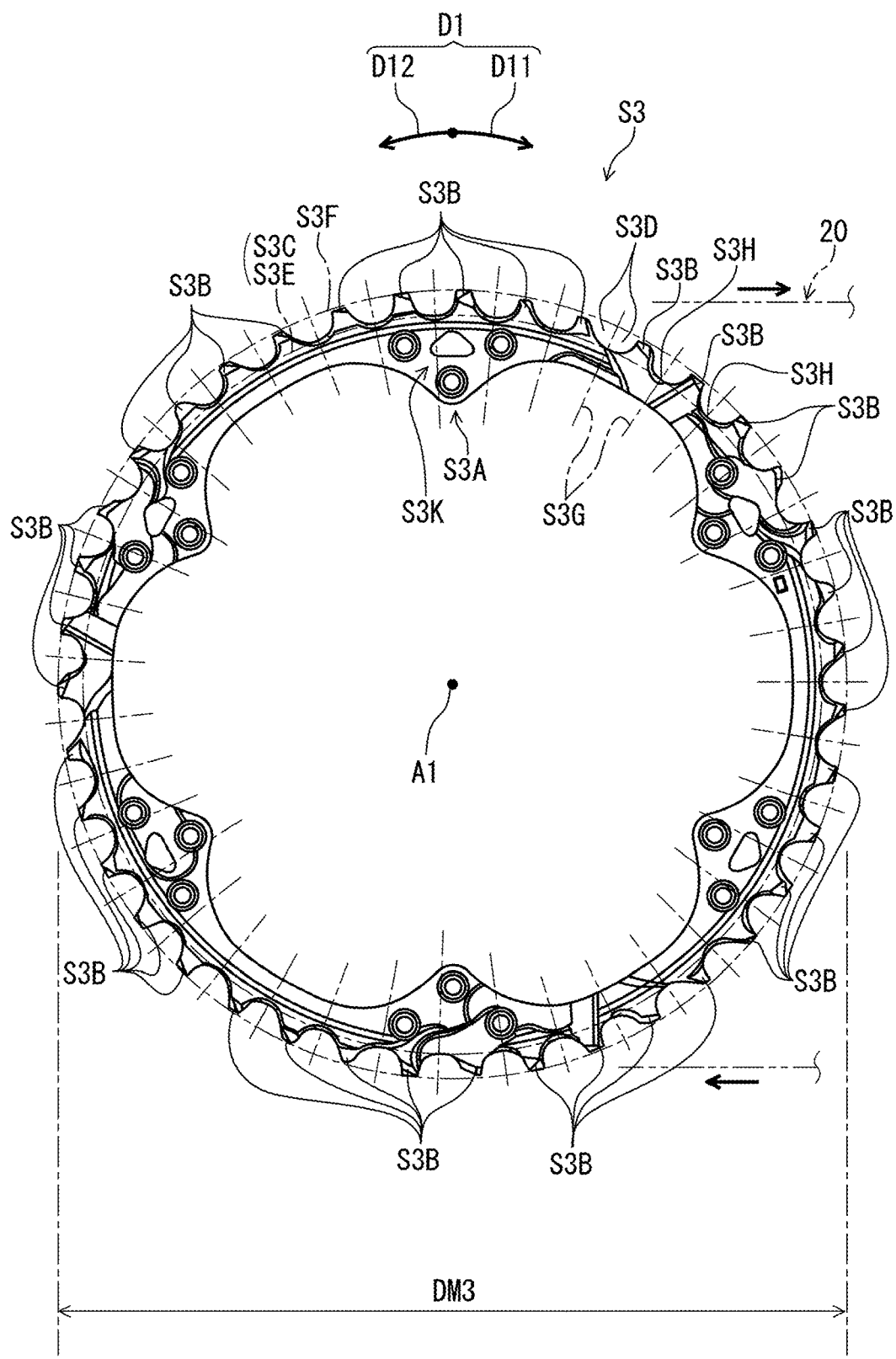
FIG. 7 is a side elevational view of a bicycle rear sprocket of the bicycle sprocket arrangement illustrated in FIG. 2.

As seen in FIG. 7, the bicycle rear sprocket S3 comprises a sprocket body S3A, a plurality of sprocket teeth S3B, an outer periphery S3C, a plurality of tooth-spaces S3D, a root circle S3E, an outer diameter circle S3F, a plurality of radial lines S3G, and a plurality of tooth bottoms S3H. A total tooth-space number of the bicycle rear sprocket S3 is 39, and the total number of the sprocket teeth S3B is 39. The above description regarding the structure of the bicycle rear sprocket S1 can apply to the bicycle rear sprocket S3 by replacing at least partly the reference numeral "S1" with "S3."

Figure 8:
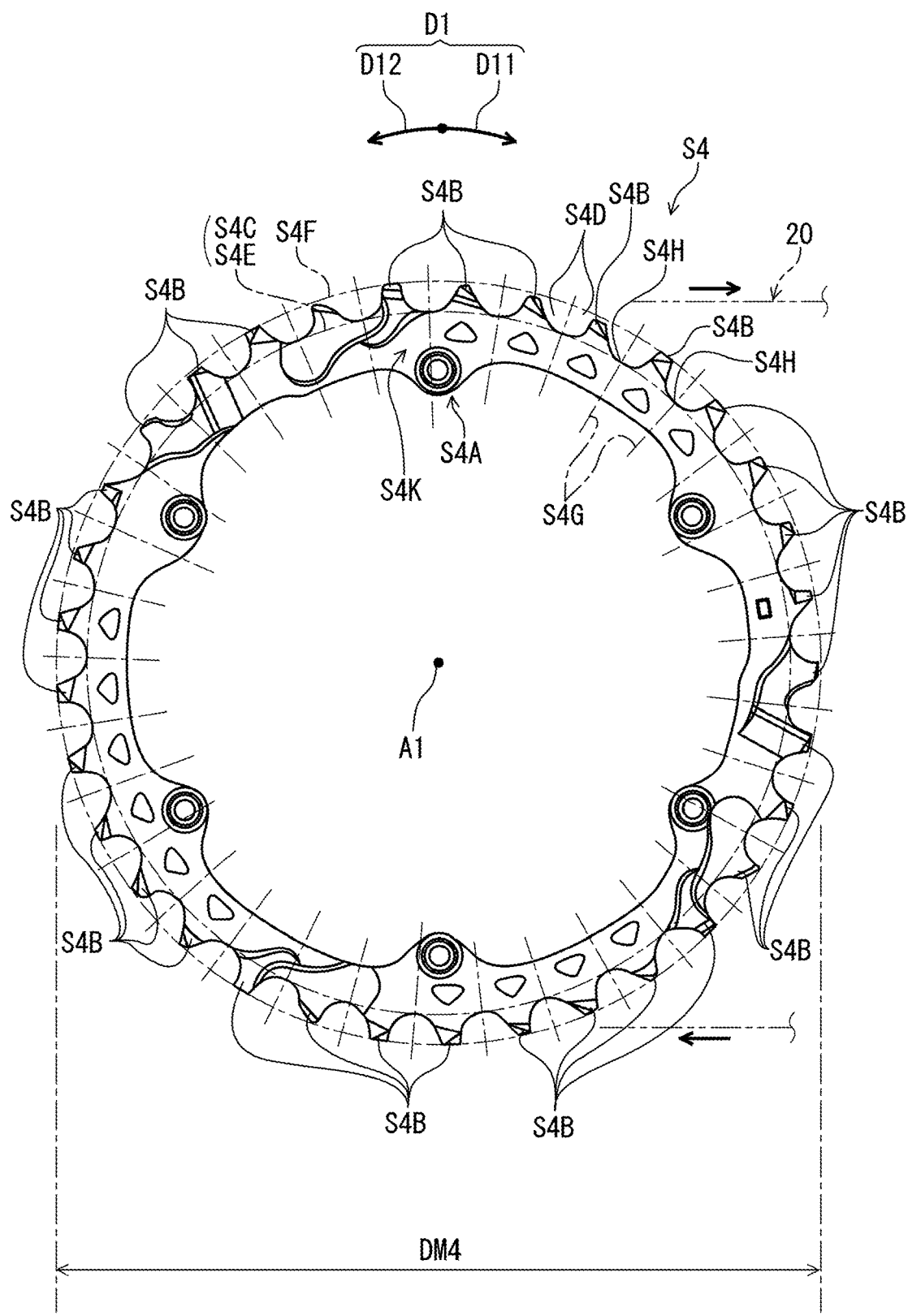
FIG. 8 is a side elevational view of a bicycle rear sprocket of the bicycle sprocket arrangement illustrated in FIG. 2.

As seen in FIG. 8, the bicycle rear sprocket S4 comprises a sprocket body S4A, a plurality of sprocket teeth S4B, an outer periphery S4C, a plurality of tooth-spaces S4D, a root circle S4E, an outer diameter circle S4F, a plurality of radial lines S4G, and a plurality of tooth bottoms S4H. A total tooth-space number of the bicycle rear sprocket S4 is 33, and the total number of the sprocket teeth S4B is 33. The above description regarding the structure of the bicycle rear sprocket S1 can apply to the bicycle rear sprocket S4 by replacing at least partly the reference numeral "S1" with "S4."

Figure 9:
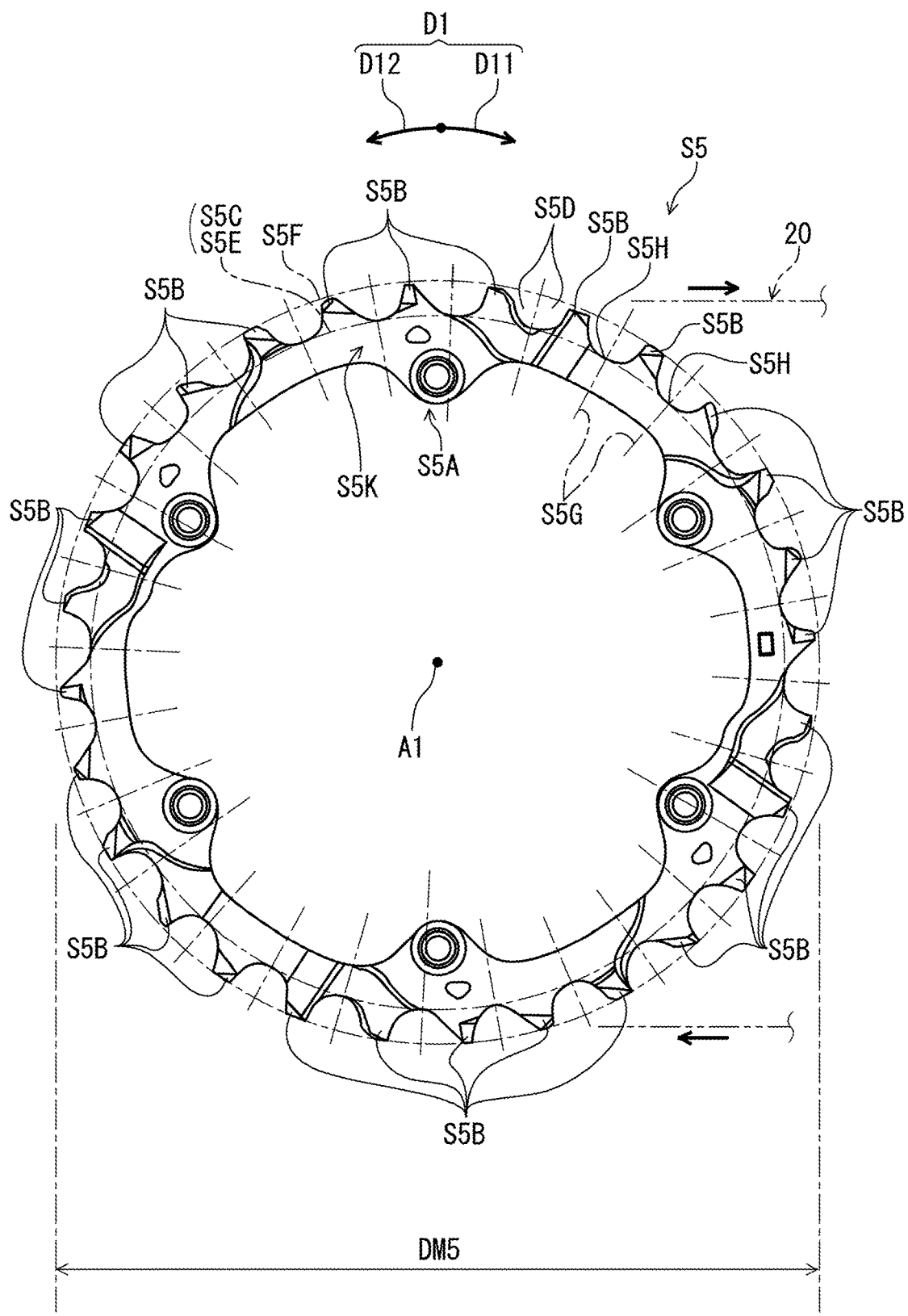
FIG. 9 is a side elevational view of a bicycle rear sprocket of the bicycle sprocket arrangement illustrated in FIG. 2.

As seen in FIG. 9, the bicycle rear sprocket S5 comprises a sprocket body S5A, a plurality of sprocket teeth S5B, an outer periphery S5C, a plurality of tooth-spaces S5D, a root circle S5E, an outer diameter circle S5F, a plurality of radial lines S5G, and a plurality of tooth bottoms S5H. A total tooth-space number of the bicycle rear sprocket S5 is 28, and the total number of the sprocket teeth S5B is 28. The above description regarding the structure of the bicycle rear sprocket S1 can apply to the bicycle rear sprocket S5 by replacing at least partly the reference numeral "S1" with "S5."

Figure 10:
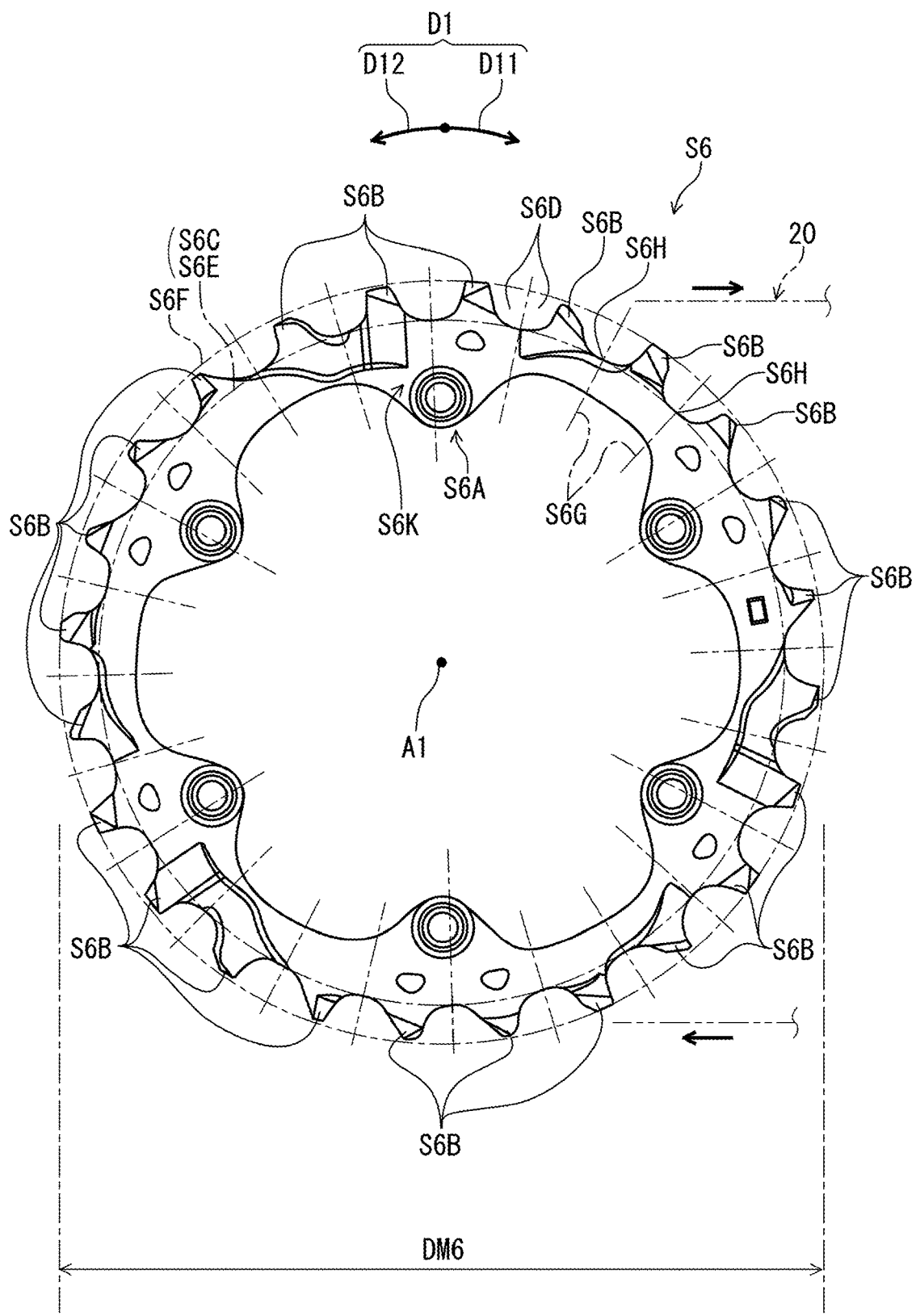
FIG. 10 is a side elevational view of a bicycle rear sprocket of the bicycle sprocket arrangement illustrated in FIG. 2.

As seen in FIG. 10, the bicycle rear sprocket S6 comprises a sprocket body S6A, a plurality of sprocket teeth S6B, an outer periphery S6C, a plurality of tooth-spaces S6D, a root circle S6E, an outer diameter circle S6F, a plurality of radial lines S6G, and a plurality of tooth bottoms S6H. A total tooth-space number of the bicycle rear sprocket S6 is 24, and the total number of the sprocket teeth S6B is 24. The above description regarding the structure of the bicycle rear sprocket S1 can apply to the bicycle rear sprocket S6 by replacing at least partly the reference numeral "S1" with "S6."

Figure 11:
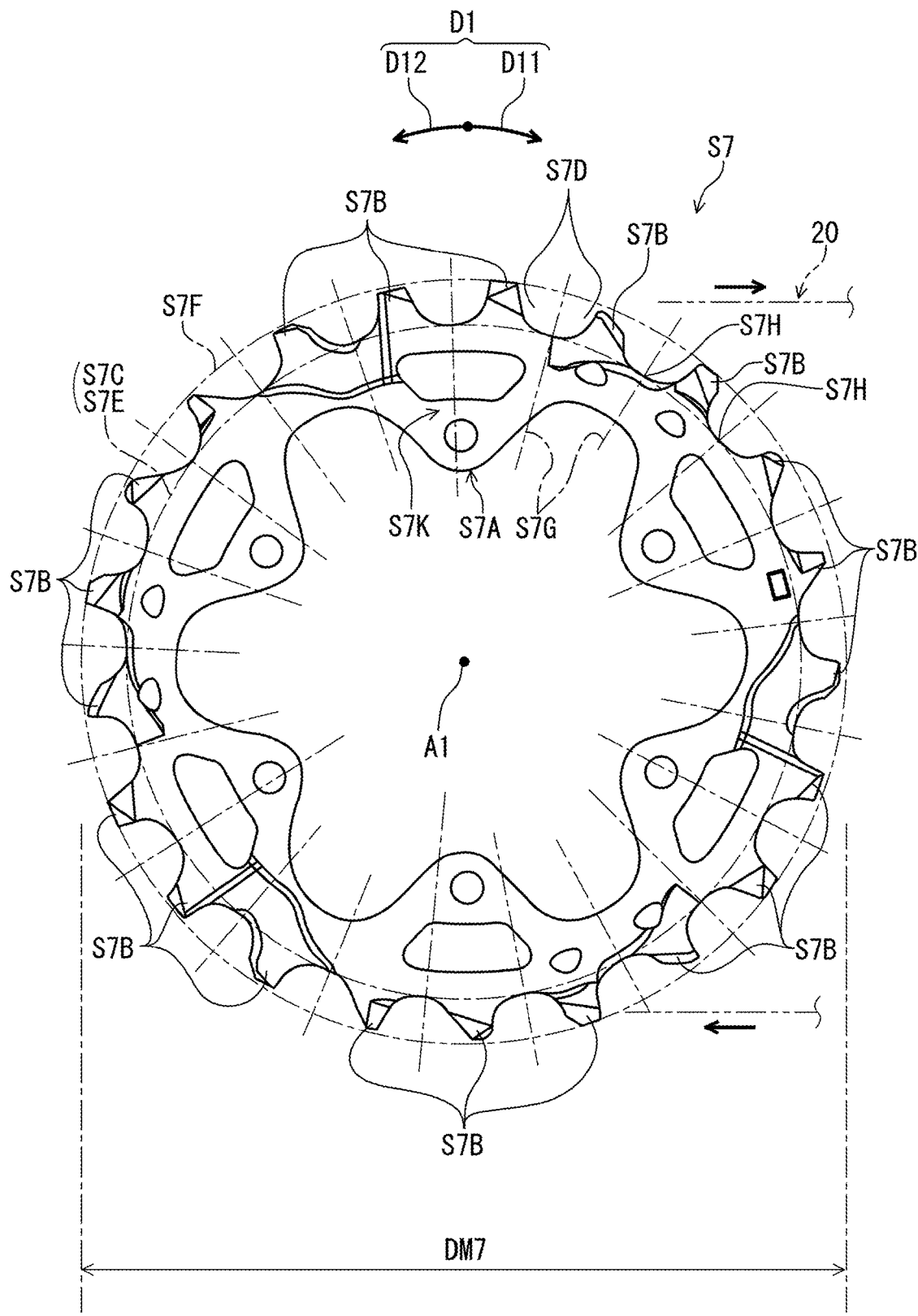
FIG. 11 is a side elevational view of a bicycle rear sprocket of the bicycle sprocket arrangement illustrated in FIG. 2.

As seen in FIG. 11, the bicycle rear sprocket S7 comprises a sprocket body S7A, a plurality of sprocket teeth S7B, an outer periphery S7C, a plurality of tooth-spaces S7D, a root circle S7E, an outer diameter circle S7F, a plurality of radial lines S7G, and a plurality of tooth bottoms S7H. A total tooth-space number of the bicycle rear sprocket S7 is 21, and the total number of the sprocket teeth S7B is 21. The above description regarding the structure of the bicycle rear sprocket S1 can apply to the bicycle rear sprocket S7 by replacing at least partly the reference numeral "S1" with "S7."

Figure 12:
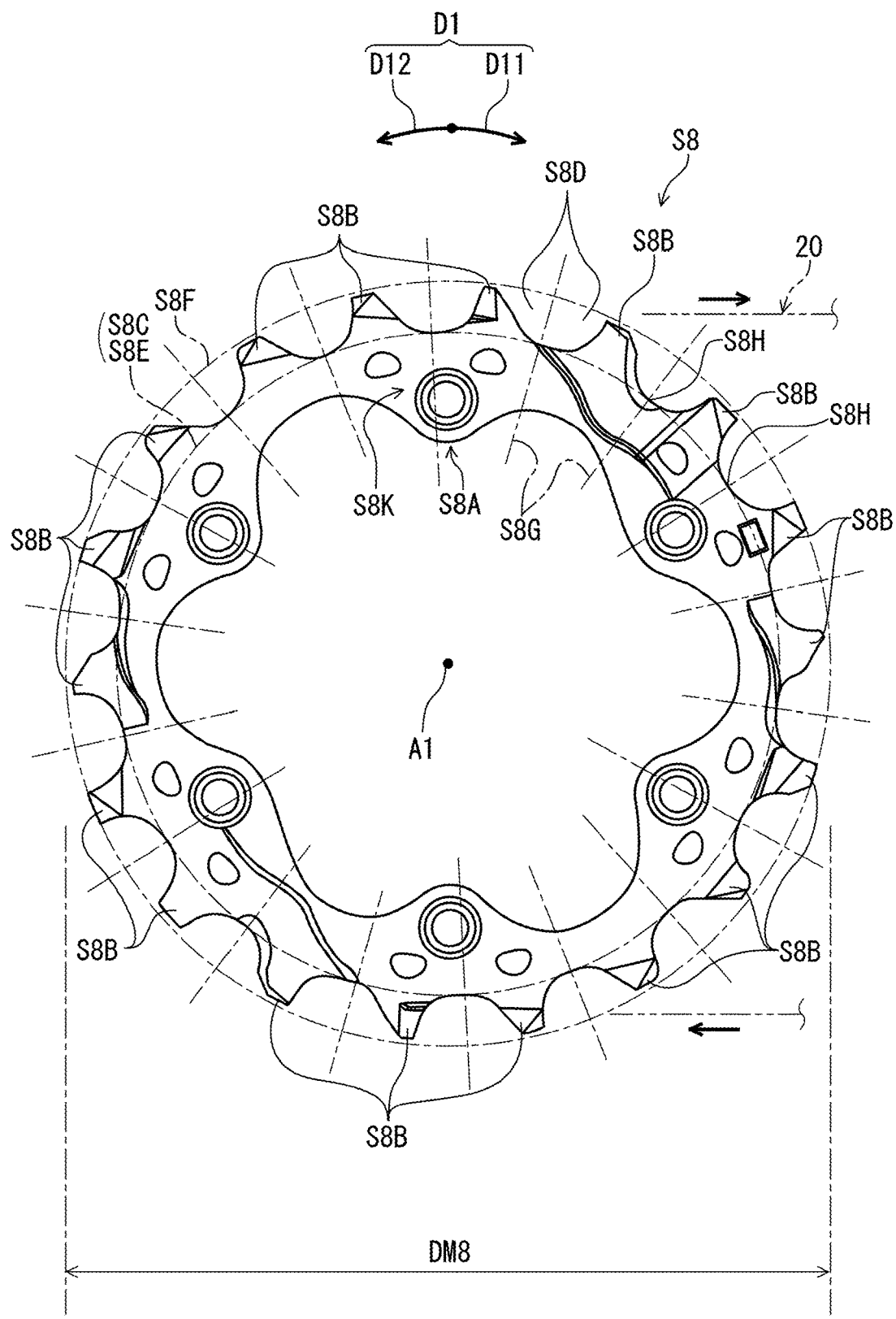
FIG. 12 is a side elevational view of a bicycle rear sprocket of the bicycle sprocket arrangement illustrated in FIG. 2.

As seen in FIG. 12, the bicycle rear sprocket S8 comprises a sprocket body S8A, a plurality of sprocket teeth S8B, an outer periphery S8C, a plurality of tooth-spaces S8D, a root circle S8E, an outer diameter circle S8F, a plurality of radial lines S8G, and a plurality of tooth bottoms S8H. A total tooth-space number of the bicycle rear sprocket S8 is 18, and the total number of the sprocket teeth S8B is 18. The above description regarding the structure of the bicycle rear sprocket S1 can apply to the bicycle rear sprocket S8 by replacing at least partly the reference numeral "S1" with "S8."

Figure 13:
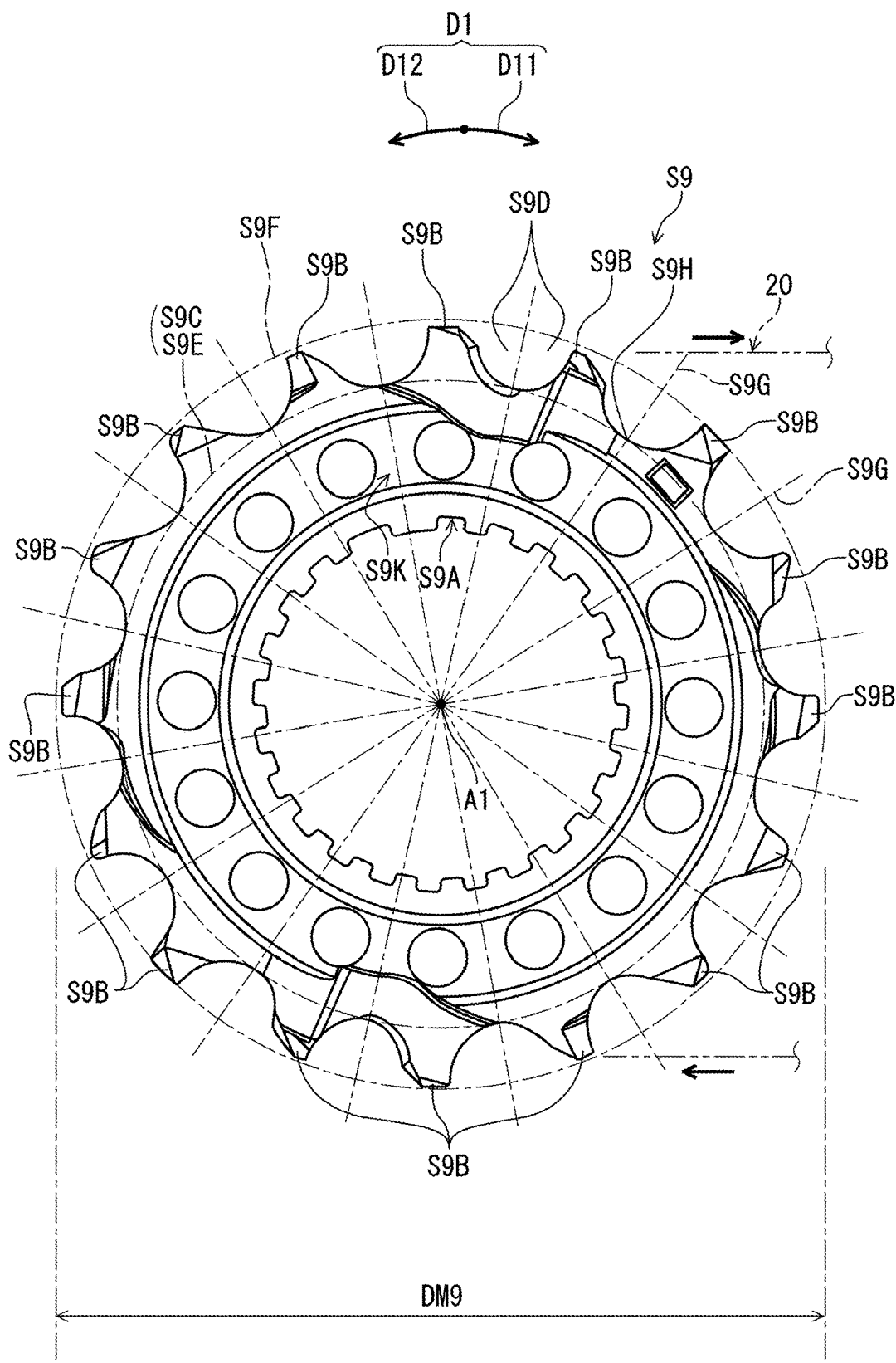
FIG. 13 is a side elevational view of a bicycle rear sprocket of the bicycle sprocket arrangement illustrated in FIG. 2.

As seen in FIG. 13, the bicycle rear sprocket S9 comprises a sprocket body S9A, a plurality of sprocket teeth S9B, an outer periphery S9C, a plurality of tooth-spaces S9D, a root circle S9E, an outer diameter circle S9F, a plurality of radial lines S9G, and a plurality of tooth bottoms S9H. A total tooth-space number of the bicycle rear sprocket S9 is 16, and the total number of the sprocket teeth S9B is 16. The above description regarding the structure of the bicycle rear sprocket S1 can apply to the bicycle rear sprocket S9 by replacing at least partly the reference numeral "S1" with "S9."

Figure 14:
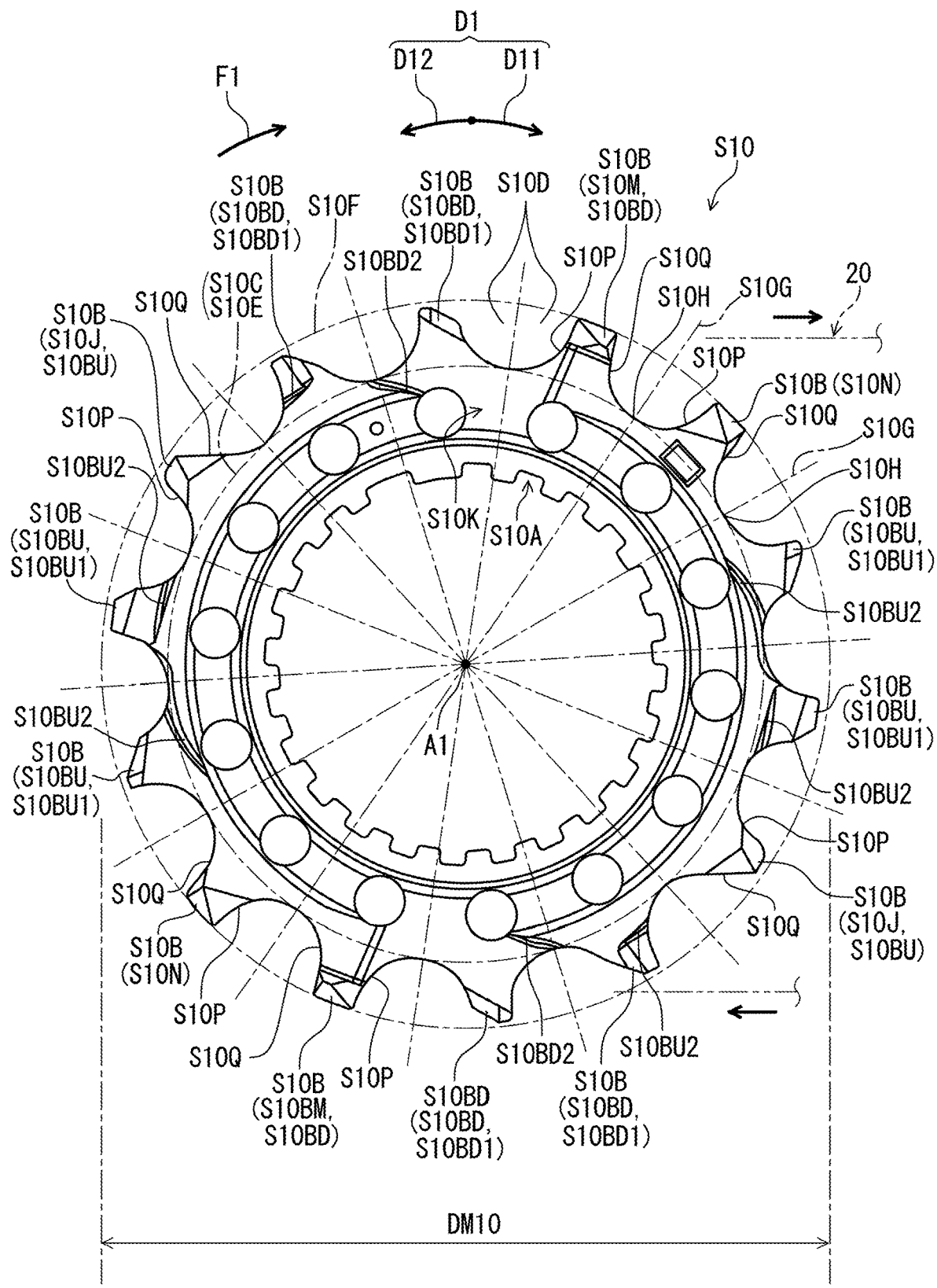
FIG. 14 is a side elevational view of a bicycle rear sprocket of the bicycle sprocket arrangement illustrated in FIG. 2.

As seen in FIG. 14, the bicycle rear sprocket S10 comprises a sprocket body S10A, a plurality of sprocket teeth S10B, an outer periphery S10C, a plurality of tooth-spaces S10D, a root circle S10E, an outer diameter circle S10F, a plurality of radial lines S10G, and a plurality of tooth bottoms S10H. A total tooth-space number of the bicycle rear sprocket S10 is 14, and the total number of the sprocket teeth S10B is 14. The above description regarding the structure of the bicycle rear sprocket S1 can apply to the bicycle rear sprocket S10 by replacing at least partly the reference numeral "S1" with "S10."

Figure 15:
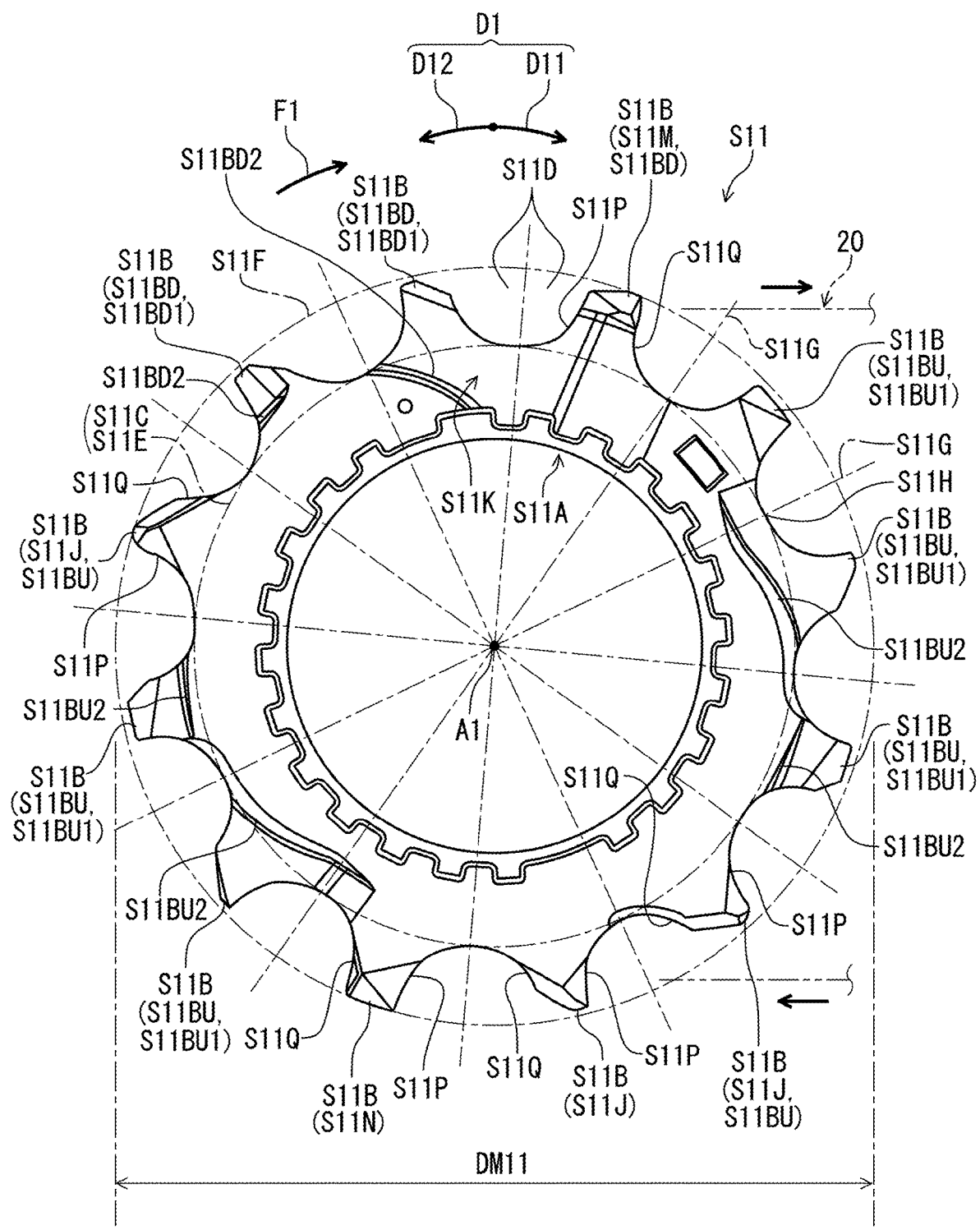
FIG. 15 is a side elevational view of a bicycle rear sprocket of the bicycle sprocket arrangement illustrated in FIG. 2.

As seen in FIG. 15, the bicycle rear sprocket S11 comprises a sprocket body S11A, a plurality of sprocket teeth S11B, an outer periphery S11C, a plurality of tooth-spaces S11D, a root circle S11E, an outer diameter circle S11F, a plurality of radial lines S11G, and a plurality of tooth bottoms S11H. A total tooth-space number of the bicycle rear sprocket S11 is 12, and the total number of the sprocket teeth S11B is 12. The above description regarding the structure of the bicycle rear sprocket S1 can apply to the bicycle rear sprocket S11 by replacing at least partly the reference numeral "S1" with "S11."

Figure 16:
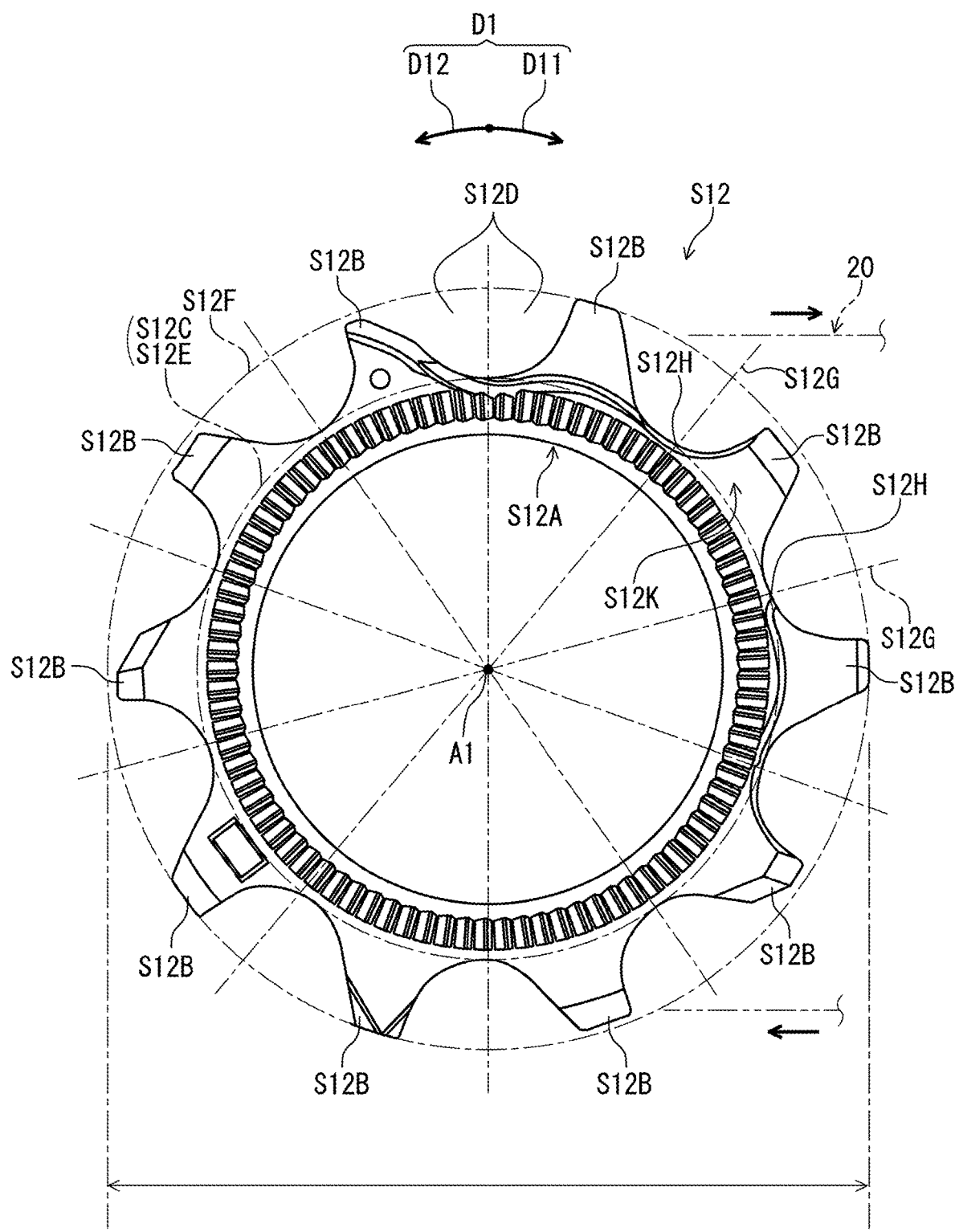
FIG. 16 is a side elevational view of a bicycle rear sprocket of the bicycle sprocket arrangement illustrated in FIG. 2.

As seen in FIG. 16, the bicycle rear sprocket S12 comprises a sprocket body S12A, a plurality of sprocket teeth S12B, an outer periphery S12C, a plurality of tooth-spaces S12D, a root circle S12E, an outer diameter circle S12F, a plurality of radial lines S12G, and a plurality of tooth bottoms S12H. A total tooth-space number of the bicycle rear sprocket S12 is 10, and the total number of the sprocket teeth S12B is 10. The above description regarding the structure of the bicycle rear sprocket S1 can apply to the bicycle rear sprocket S12 by replacing at least partly the reference numeral "S1" with "S12."

Figure 17:
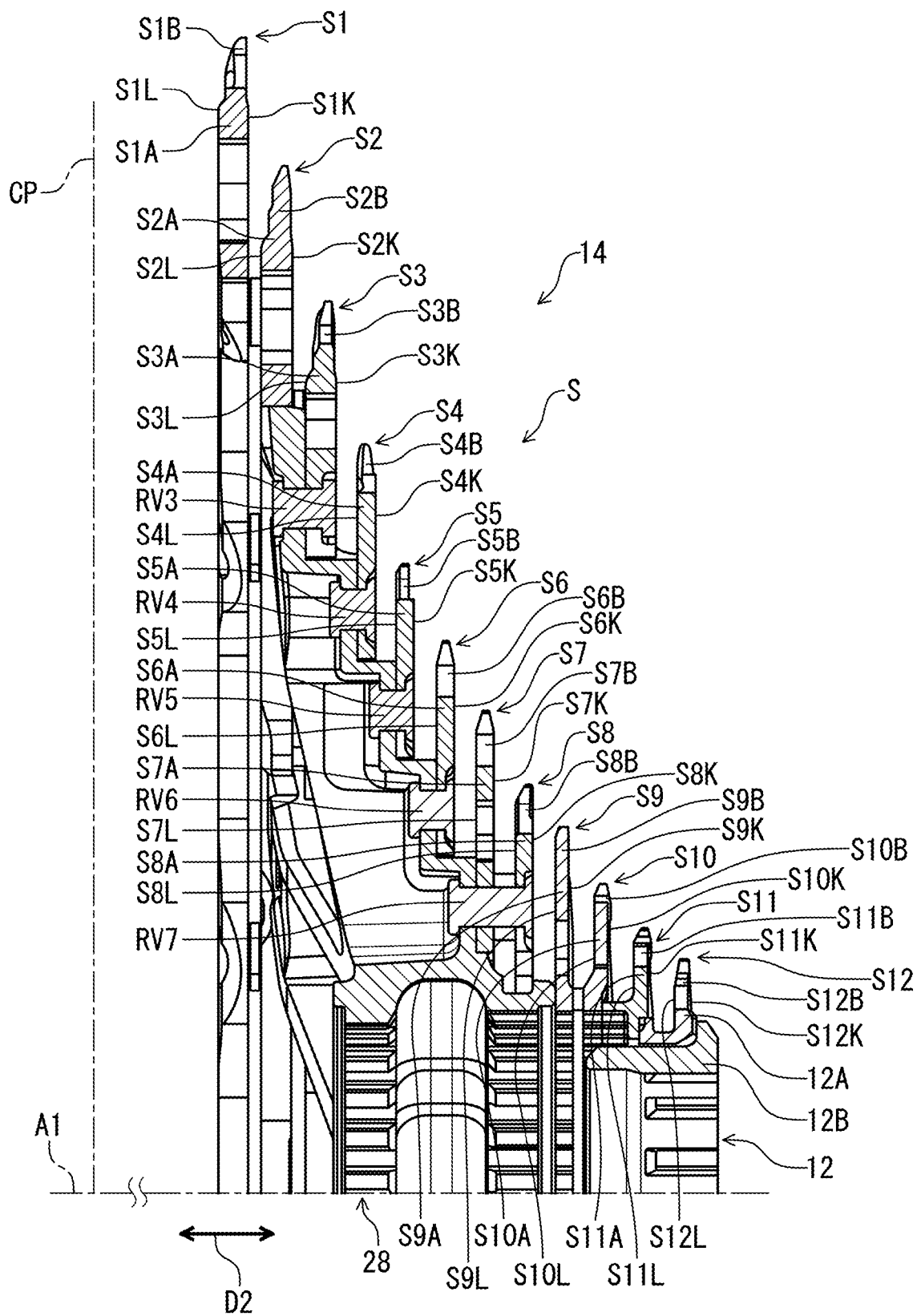
FIG. 17 is a cross-sectional view of the bicycle sprocket arrangement taken along line XVII-XVII of FIG. 2.

As seen in FIG. 17, the sprocket body S1A and the plurality of sprocket teeth S1B define a bicycle outward surface S1K and a bicycle inward surface S1L. The bicycle inward surface S1L reversely faces relative to the bicycle outward surface S1K in the axial direction D2 with respect to the rotational center axis A1. The bicycle inward surface S1L is provided on a reverse side of the bicycle outward surface S1K in the axial direction D2. The bicycle inward surface S1L is configured to face toward a center plane CP of the bicycle frame BF in a mounting state where the bicycle rear sprocket S1 is mounted to the bicycle frame BF. The center plane CP is perpendicular to the rotational center axis A1 of the bicycle sprocket arrangement 14.

The sprocket body S2A and the plurality of sprocket teeth S2B define a bicycle outward surface S2K and a bicycle inward surface S2L. The sprocket body S3A and the plurality of sprocket teeth S3B define a bicycle outward surface S3K and a bicycle inward surface S3L. The sprocket body S4A and the plurality of sprocket teeth S4B define a bicycle outward surface S4K and a bicycle inward surface S4L. The sprocket body S5A and the plurality of sprocket teeth S5B define a bicycle outward surface S5K and a bicycle inward surface SSL. The sprocket body S6A and the plurality of sprocket teeth S6B define a bicycle outward surface S6K and a bicycle inward surface S6L. The sprocket body S7A and the plurality of sprocket teeth S7B define a bicycle outward surface S7K and a bicycle inward surface S7L. The sprocket body S8A and the plurality of sprocket teeth S8B define a bicycle outward surface S8K and a bicycle inward surface S8L. The sprocket body S9A and the plurality of sprocket teeth S9B define a bicycle outward surface S9K and a bicycle inward surface S9L. The sprocket body S10A and the plurality of sprocket teeth S10B define a bicycle outward surface S10K and a bicycle inward surface S10L. The sprocket body S11A and the plurality of sprocket teeth S11B define a bicycle outward surface S11K and a bicycle inward surface S11L. The sprocket body S12A and the plurality of sprocket teeth S12B define a bicycle outward surface S12K and a bicycle inward surface S12L.

The above description regarding the bicycle outward surface S1K and the bicycle inward surface S1L of the bicycle rear sprocket S1 can apply to the bicycle rear sprockets S2 to S12 by replacing at least partly the reference numeral "S1" with the reference numerals "S2" to "S12," respectively.

As seen in FIG. 14, the plurality of sprocket teeth S10B includes a plurality of driving-noise reduction teeth S10M, S10N and S10J. A total number of the plurality of driving-noise reduction teeth S10M, S10N and S10J is equal to or larger than one-third of a total tooth-space number of the plurality of sprocket teeth S10B. The total tooth-space number of the plurality of sprocket teeth S10B ranges from 9 to 18. The total number of the plurality of driving-noise reduction teeth S10M, S10N and S10J is equal to or larger than three. The total number of the plurality of driving-noise reduction teeth S10M, S10N and S10J is equal to or smaller than 16. In this embodiment, the total number of the plurality of driving-noise reduction teeth S10M, S10N and S10J is 6 while the total tooth-space number of the plurality of sprocket teeth S10B is 14. The total number of the plurality of driving-noise reduction teeth S10M is two. The total number of the plurality of driving-noise reduction teeth S10N is two. The total number of the plurality of driving-noise reduction teeth S10J is two. However, the total tooth-space number of the plurality of sprocket teeth S10B is not limited to this embodiment and the above ranges. The total number of the plurality of driving-noise reduction teeth S10M, S10N and S10J is not limited to this embodiment and the above ranges.

Each of the plurality of driving-noise reduction teeth S10M, S10N and S10J comprises an upstream circumferential surface S10P and a downstream circumferential surface S10Q. The downstream circumferential surface S10Q reversely faces relative to the upstream circumferential surface S10P in the circumferential direction D1 with respect to the rotational center axis A1. The downstream circumferential surface S10Q faces in the driving rotational direction D11. The upstream circumferential surface S10P faces in the reverse rotational direction D12 to receive the driving rotational force F1 from a roller of the bicycle chain 20.

Figure 18:
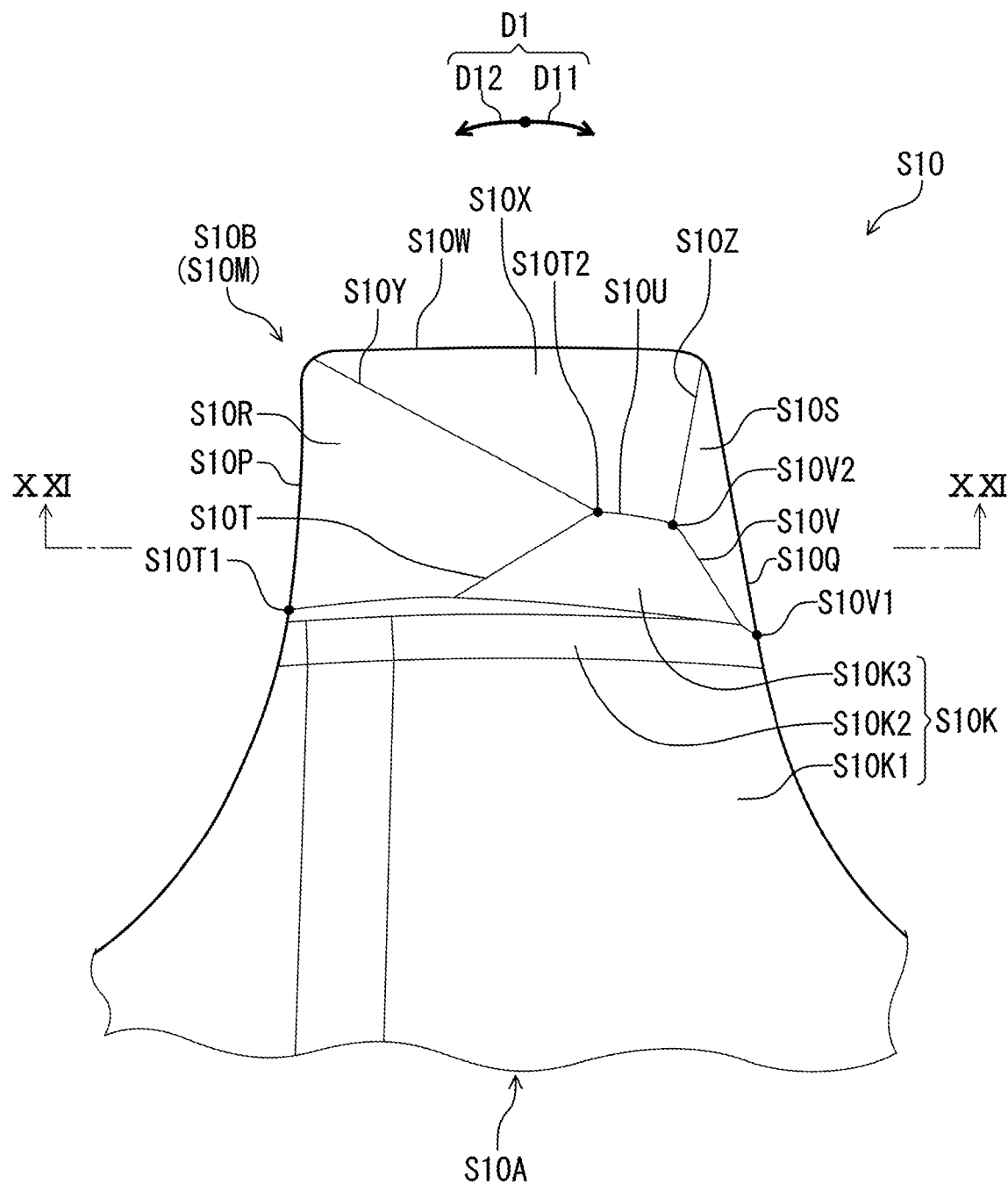
FIG. 18 is a side elevational view of a driving-noise reduction tooth of the bicycle rear sprocket illustrated in FIG. 14.
Figure 19:
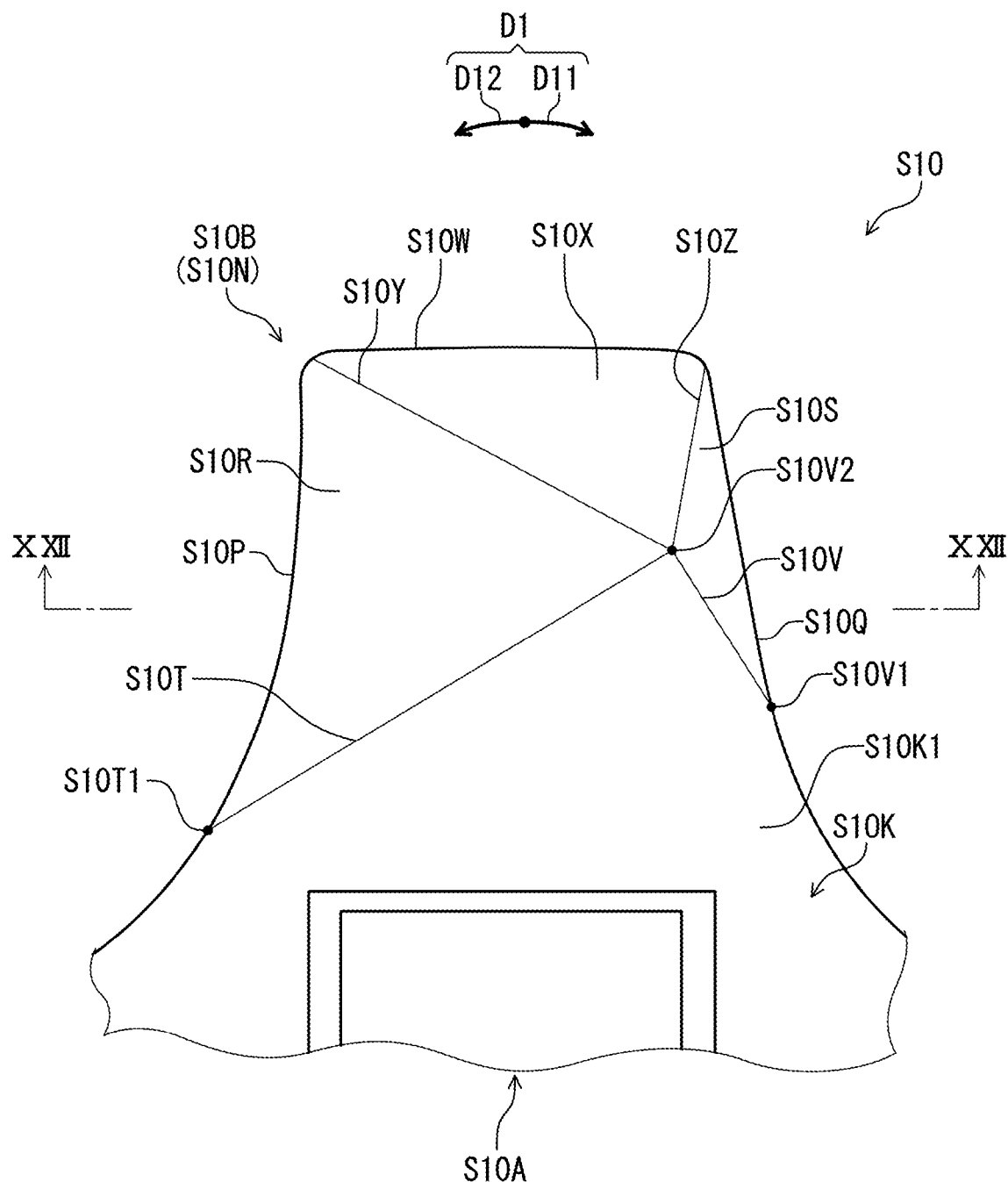
FIG. 19 is a side elevational view of another driving-noise reduction tooth of the bicycle rear sprocket illustrated in FIG. 14.
Figure 20:
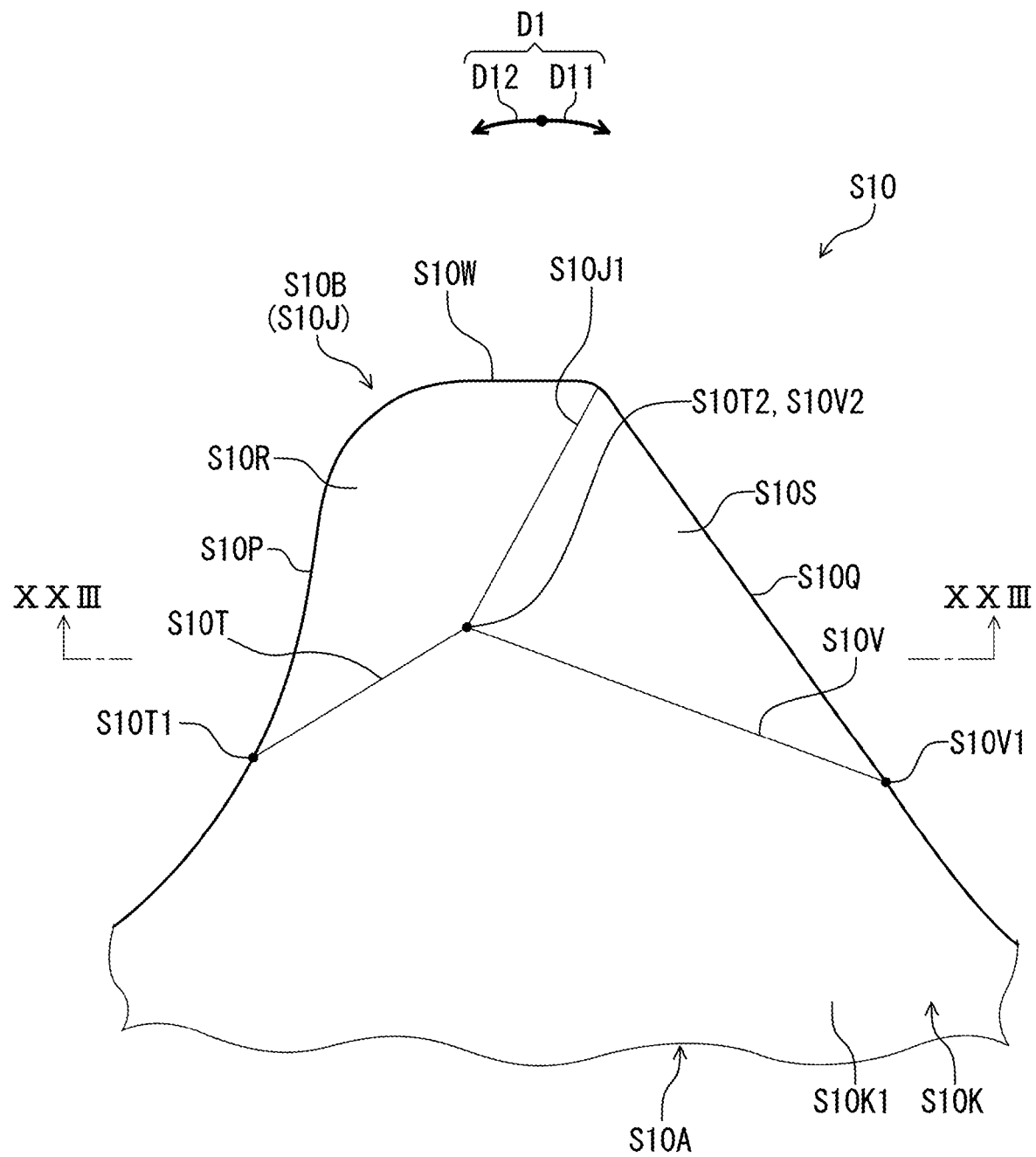
FIG. 20 is a side elevational view of another driving-noise reduction tooth of the bicycle rear sprocket illustrated in FIG. 14.

As seen in FIGS. 18 to 20, each of the plurality of driving-noise reduction teeth S10M, S10N and S10J comprises a first chamfer S10R and a second chamfer S10S. The first chamfer S10R extends from the upstream circumferential surface S10P toward the bicycle outward surface S10K. The first chamfer S10R extends from the upstream circumferential surface S10P toward the downstream circumferential surface S10Q of the bicycle rear sprocket S10. The second chamfer S10S extends from the downstream circumferential surface S10Q toward the bicycle outward surface S10K. The second chamfer S10S extends from the downstream circumferential surface S10Q toward the upstream circumferential surface S10P of the bicycle rear sprocket S10.

The first chamfer S10R has a first borderline S10T relative to the bicycle outward surface S10K. The first borderline S10T is defined between the first chamfer S10R and the bicycle outward surface S10K. The first borderline S10T has a first end S10T1 and a first opposite end S10T2. The first end S10T1 is disposed on the upstream circumferential surface S10P. The first opposite end S10T2 is opposite to the first end S10T1. The first borderline S10T extends from the upstream circumferential surface S10P toward the second chamfer S10S. The first opposite end S10T2 is farther from the upstream circumferential surface S10P than the first end S10T1 in the circumferential direction D1.

The second chamfer S10S has a second borderline S10V relative to the bicycle outward surface S10K. The second borderline S10V is defined between the second chamfer S10S and the bicycle outward surface S10K. The second borderline S10V has a second end S10V1 and a second opposite end S10V2. The second end S10V1 is disposed on the downstream circumferential surface S10Q. The second opposite end S10V2 is opposite to the second end S10V1. The second borderline S10V extends from the downstream circumferential surface S10Q toward the second chamfer S10S. The second opposite end S10V2 is farther from the downstream circumferential surface S10Q than the second end S10V1 in the circumferential direction D1.

The first opposite end S10T2 of the first borderline S10T and the second opposite end S10V2 of the second borderline S10V are disposed radially outwardly from each of the first end S10T1 of the first borderline S10T and the second end S10V1 of the second borderline S10V with respect to the rotational center axis A1.

Figure 21:
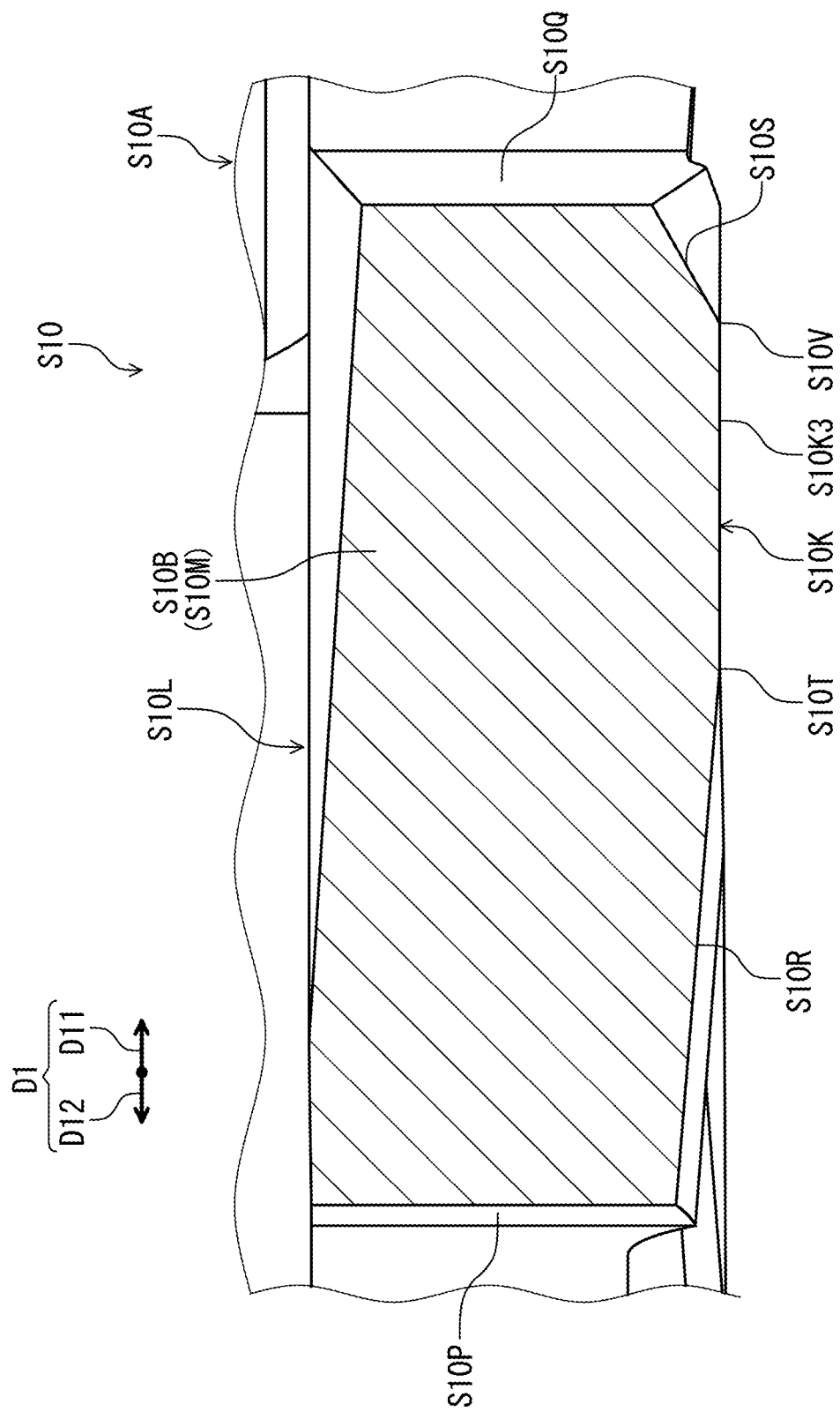
FIG. 21 is a cross-sectional view of the bicycle rear sprocket taken along line XXI-XXI of FIG. 18.
Figure 22:
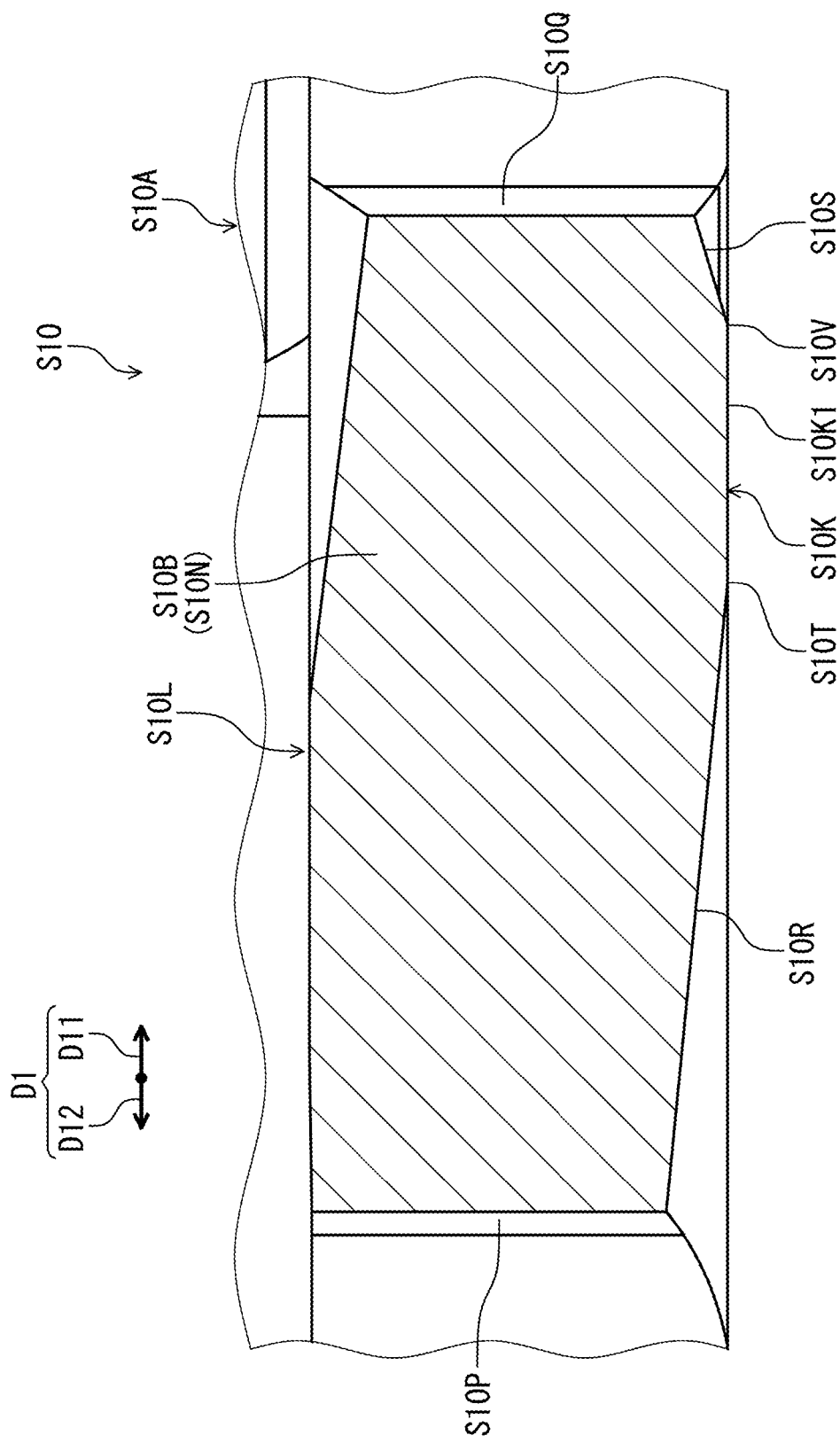
FIG. 22 is a cross-sectional view of the bicycle rear sprocket taken along line XXII-XXII of FIG. 19.
Figure 23:
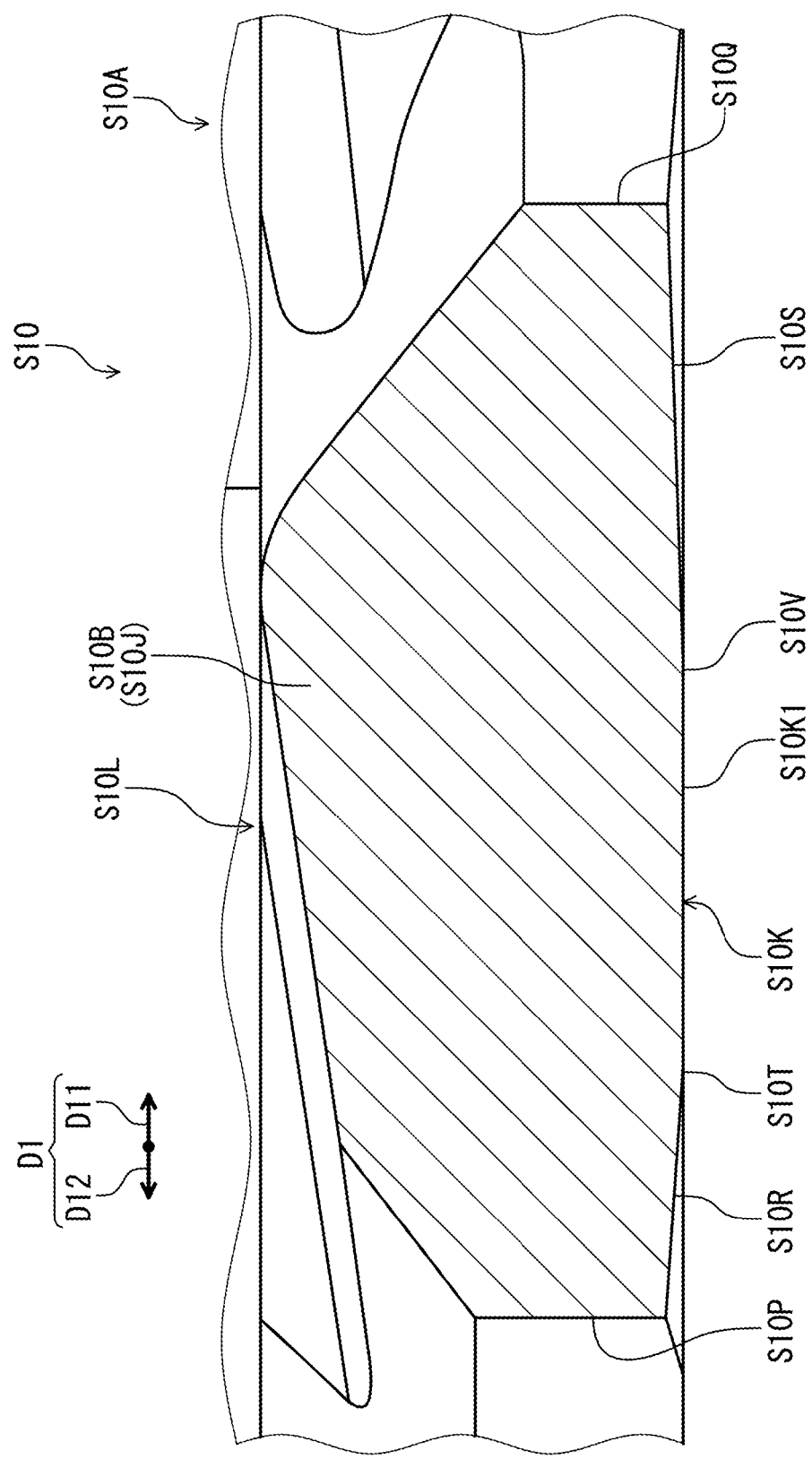
FIG. 23 is a cross-sectional view of the bicycle rear sprocket taken along line XXIII-XXIII of FIG. 20.

As seen in FIGS. 21 to 23, the first chamfer S10R is inclined relative to the bicycle outward surface S10K. The second chamfer S10S is inclined relative to the bicycle outward surface S10K.

Figure 24:
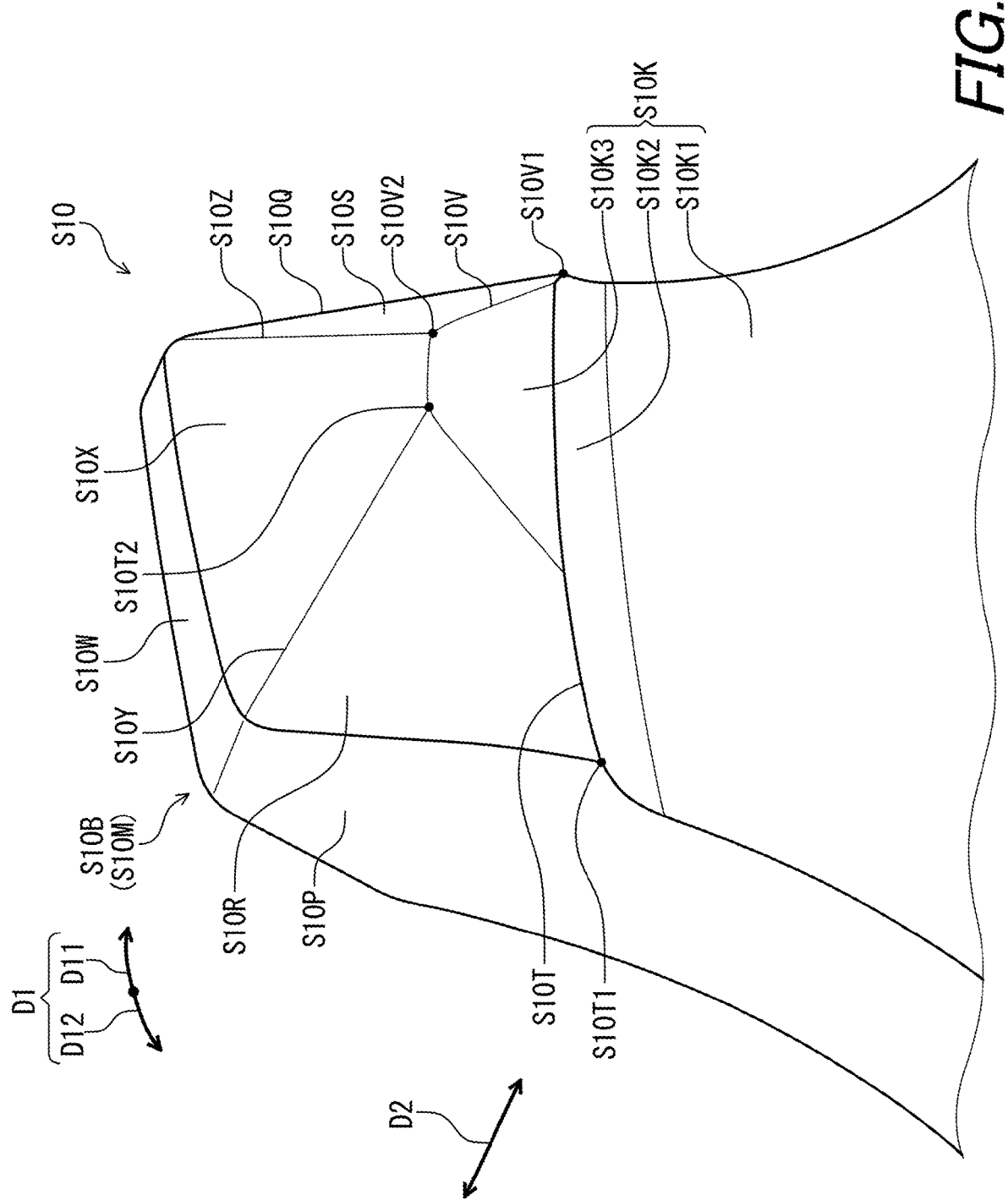
FIG. 24 is a perspective view of the driving-noise reduction tooth illustrated in FIG. 18.

As seen in FIG. 24, the bicycle outward surface S10K includes an outward base surface S10K1, a curved surface S10K2, and an intermediate surface S10K3. The outward base surface S10K1 faces in the axial direction D2. The curved surface S10K2 of the driving-noise reduction tooth S10M is provided radially between the outward base surface S10K1 and the intermediate surface S10K3. The intermediate surface S10K3 is provided between the first chamfer S10R of the driving-noise reduction tooth S10M and the second chamfer S10S of the driving-noise reduction tooth S10M in the circumferential direction D1.

As seen in FIGS. 21 and 24, the first chamfer S10R of the driving-noise reduction tooth S10M is inclined relative to the curved surface S10K2 and the intermediate surface S10K3. The second chamfer S10S of the driving-noise reduction tooth S10M is inclined relative to the curved surface S10K2 and the intermediate surface S10K3.

As seen in FIGS. 18 and 24, the first borderline S10T of the driving-noise reduction tooth S10M is defined between the first chamfer S10R of the driving-noise reduction tooth S10M and each of the curved surface S10K2 and the intermediate surface S10K3. The second borderline S10V of the driving-noise reduction tooth S10M is defined between the second chamfer S10S of the driving-noise reduction tooth S10M and each of the curved surface S10K2 and the intermediate surface S10K3.

Figure 25:
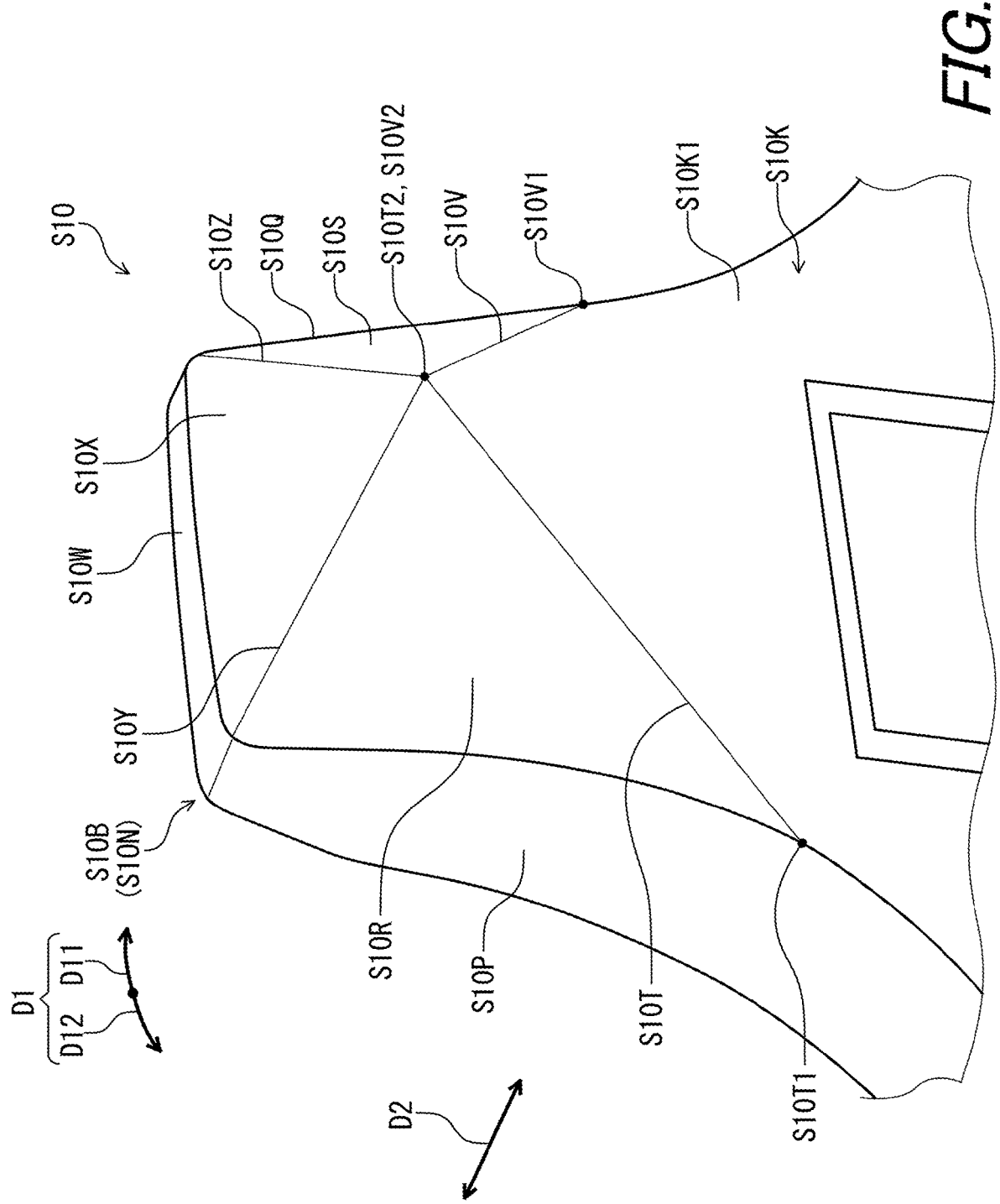
FIG. 25 is a perspective view of the driving-noise reduction tooth illustrated in FIG. 19.

As seen in FIGS. 22 and 25, the first chamfer S10R of the driving-noise reduction tooth S10N is inclined relative to the outward base surface S10K1. The second chamfer S10S of the driving-noise reduction tooth S10N is inclined relative to the outward base surface S10K1.

As seen in FIGS. 19 and 25, the first borderline S10T of the driving-noise reduction tooth S10N is defined between the first chamfer S10R of the driving-noise reduction tooth S10N and the intermediate surface S10K3. The second borderline S10V of the driving-noise reduction tooth S10N is defined between the second chamfer S10S of the driving-noise reduction tooth S10N and the intermediate surface S10K3. In this embodiment, the first opposite end S10T2 of the first borderline S10T overlaps with the second opposite end S10V2 of the second borderline S10V.

Figure 26:
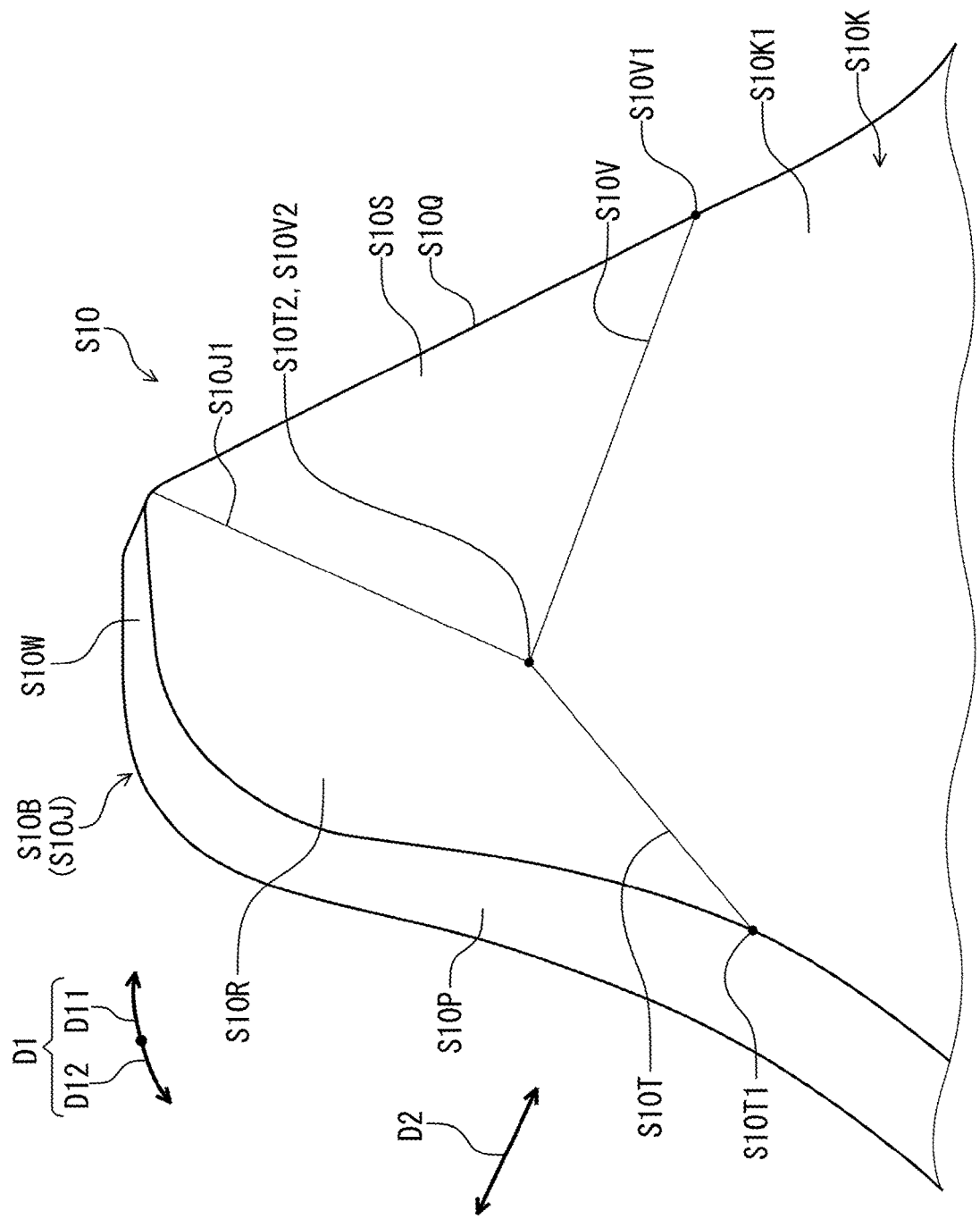
FIG. 26 is a perspective view of the driving-noise reduction tooth illustrated in FIG. 20.

As seen in FIGS. 23 and 26, the first chamfer S10R of the driving-noise reduction tooth S10J is inclined relative to the outward base surface S10K1. The second chamfer S10S of the driving-noise reduction tooth S10J is inclined relative to the outward base surface S10K1. The first chamfer S10R is adjacent to the second chamfer S10S without another chamfer between the first and second chamfers S10R and S10S in the circumferential direction D1. The first chamfer S10R of the driving-noise reduction tooth S10J has an additional borderline S10.11. The additional borderline S10J1 is defined between the first chamfer S10R and the second chamfer S10S. In this embodiment, the first opposite end S10T2 of the first borderline S10T overlaps with the second opposite end S10V2 of the second borderline S10V.

As seen in FIGS. 24 and 25, each of the plurality of driving-noise reduction teeth S10M and S10N includes a tooth-tip S10W and a radially outward chamfer S10X. The radially outward chamfer S10X extends radially inwardly from the tooth-tip S10W and is provided between the first chamfer S10R and the second chamfer S10S in the circumferential direction D1. The radially outward chamfer S10X is provided between the first chamfer S10R and the tooth-tip S10W. The radially outward chamfer S10X is provided between the second chamfer S10S and the tooth-tip S10W. The radially outward chamfer S10X is inclined relative to the first chamfer S10R and the second chamfer S10S.

As seen in FIGS. 18 and 19, the first chamfer S10R of each of the driving-noise reduction teeth S10M and S10N has a third borderline S10Y relative to the radially outward chamfer S10X. The third borderline S10Y is defined between the first chamfer S10R and the radially outward chamfer S10X. The third borderline S10Y intersects with the first borderline S10T at the first opposite end S10T2 of the first borderline S10T. The second chamfer S10S has a fourth borderline S10Z relative to the radially outward chamfer S10X. The fourth borderline S10Z is defined between the second chamfer S10S and the radially outward chamfer S10X. The fourth borderline S10Z intersects with the first borderline S10T at the second opposite end S10V2 of the second borderline S10V.

As seen in FIG. 18, the radially outward chamfer S10X of the driving-noise reduction tooth S10M has a fifth borderline S10U relative to the bicycle outward surface S10K. The fifth borderline S10U is defined between the radially outward chamfer S10X and the bicycle outward surface S10K. The fifth borderline S10U intersects with the first borderline S10T at the first opposite end S10T2 of the first borderline S10T. The fifth borderline S10U intersects with the second borderline S10V at the second opposite end S10V2 of the second borderline S10U. However, the fifth borderline S10U can be omitted from the driving-noise reduction tooth S10M.

As seen in FIG. 14, the plurality of sprocket teeth S10B includes at least one upshifting facilitation tooth S10BU configured to facilitate an upshifting operation in which the bicycle chain 20 is shifted from the bicycle rear sprocket S10 toward the neighboring smaller rear sprocket S11 (see e.g., FIG. 3). The at least one upshifting facilitation tooth S10BU includes at least one axially recessed tooth S10BU1. In this embodiment, the plurality of sprocket teeth S10B includes a plurality of upshifting facilitation teeth S10BU configured to facilitate the upshifting operation. The plurality of upshifting facilitation teeth S10BU includes a plurality of axially recessed teeth S10BU1 and the plurality of driving-noise reduction teeth S10J. The axially recessed tooth S10BU1 includes an upshifting facilitation recess S10BU2 provided on the bicycle outward surface S10K to reduce interference between the bicycle rear sprocket S10 and the bicycle chain 20 in the upshifting operation. In this embodiment, the driving-noise reduction tooth S10J does not include an upshifting facilitation recess. However, the driving-noise reduction tooth S10J can include an upshifting facilitation recess.

The plurality of sprocket teeth S10B includes at least one downshifting facilitation tooth S10BD configured to facilitate a downshifting operation in which the bicycle chain 20 is shifted from the neighboring smaller rear sprocket S11 toward the bicycle rear sprocket S10. The at least one downshifting facilitation tooth S10BD includes at least one axially recessed tooth S10BD1. In this embodiment, the plurality of sprocket teeth S10B includes a plurality of downshifting facilitation teeth S10BD configured to facilitate the downshifting operation. The plurality of downshifting facilitation teeth S10BD includes a plurality of axially recessed teeth S10BD1 and the driving-noise reduction tooth S10M. The axially recessed tooth S10BD1 includes a downshifting facilitation recess S10BD2 provided on the bicycle outward surface S10K to reduce interference between the bicycle rear sprocket S10 and the bicycle chain 20 in the downshifting operation. In this embodiment, the driving-noise reduction tooth S10M does not include a downshifting facilitation recess. However, the driving-noise reduction tooth S10M can include a downshifting facilitation recess.

As seen in FIG. 15, the plurality of sprocket teeth S11B includes a plurality of driving-noise reduction teeth S11M, S11N and S11J. A total number of the plurality of driving-noise reduction teeth S11M, S11N and S11J is equal to or larger than one-third of a total tooth-space number of the plurality of sprocket teeth S11B. The total tooth-space number of the plurality of sprocket teeth S11B ranges from 9 to 18. The total number of the plurality of driving-noise reduction teeth S11M, S11N and S11J is equal to or larger than three. The total number of the plurality of driving-noise reduction teeth S11M, S11N and S11J is equal to or smaller than 16. In this embodiment, the total number of the plurality of driving-noise reduction teeth S11M, S11N and S11J is 5 while the total tooth-space number of the plurality of sprocket teeth S11B is 12. The total number of the plurality of driving-noise reduction tooth S11M is one. The total number of the plurality of driving-noise reduction tooth S11N is one. The total number of the plurality of driving-noise reduction teeth S11J is three. However, the total tooth-space number of the plurality of sprocket teeth S11B is not limited to this embodiment and the above ranges. The total number of the plurality of driving-noise reduction teeth S11M, S11N and S11J is not limited to this embodiment and the above ranges.

Each of the plurality of driving-noise reduction teeth S11M, S11N and S11J comprises an upstream circumferential surface S11P and a downstream circumferential surface S11Q. The downstream circumferential surface S11Q reversely faces relative to the upstream circumferential surface S11P in the circumferential direction D1 with respect to the rotational center axis A1. The downstream circumferential surface S11Q faces in the driving rotational direction D11. The upstream circumferential surface S11P faces in the reverse rotational direction D12 to receive the driving rotational force F1 from a roller of the bicycle chain 20.

The driving-noise reduction tooth S11M has substantially the same structure as the structure of the driving-noise reduction tooth S10M. The driving-noise reduction tooth S11N has substantially the same structure as the structure of the driving-noise reduction tooth S10N. The driving-noise reduction tooth S11J has substantially the same structure as the structure of the driving-noise reduction tooth S10J. Thus, they will not be described in detail here for the sake of brevity.

As seen in FIG. 15, the plurality of sprocket teeth S11B includes at least one upshifting facilitation tooth S11BU configured to facilitate an upshifting operation in which the bicycle chain 20 is shifted from the bicycle rear sprocket S11 toward the neighboring smaller rear sprocket S12 (see e.g., FIG. 3). The at least one upshifting facilitation tooth S11BU includes at least one axially recessed tooth S11BU1. In this embodiment, the plurality of sprocket teeth S11B includes a plurality of upshifting facilitation teeth S11BU configured to facilitate the upshifting operation. The plurality of upshifting facilitation teeth S11BU includes a plurality of axially recessed teeth S11BU1 and the plurality of driving-noise reduction teeth S11J. The axially recessed tooth S11BU1 includes an upshifting facilitation recess S11BU2 provided on the bicycle outward surface S11K to reduce interference between the bicycle rear sprocket S11 and the bicycle chain 20 in the upshifting operation. In this embodiment, the driving-noise reduction tooth S11J does not include an upshifting facilitation recess. However, the driving-noise reduction tooth S11J can include an upshifting facilitation recess.

The plurality of sprocket teeth S11B includes at least one downshifting facilitation tooth S11BD configured to facilitate a downshifting operation in which the bicycle chain 20 is shifted from the neighboring smaller rear sprocket S11 toward the bicycle rear sprocket S11. The at least one downshifting facilitation tooth S11BD includes at least one axially recessed tooth S11BD1. In this embodiment, the plurality of sprocket teeth S11B includes a plurality of downshifting facilitation teeth S11BD configured to facilitate the downshifting operation. The plurality of downshifting facilitation teeth S11BD includes a plurality of axially recessed teeth S11BD1 and the driving-noise reduction tooth S11M. The axially recessed tooth S11BD1 includes a downshifting facilitation recess S11BD2 provided on the bicycle outward surface S11K to reduce interference between the bicycle rear sprocket S11 and the bicycle chain 20 in the downshifting operation. In this embodiment, the driving-noise reduction tooth S11M does not include a downshifting facilitation recess. However, the driving-noise reduction tooth S11M can include a downshifting facilitation recess.

Figure 27:
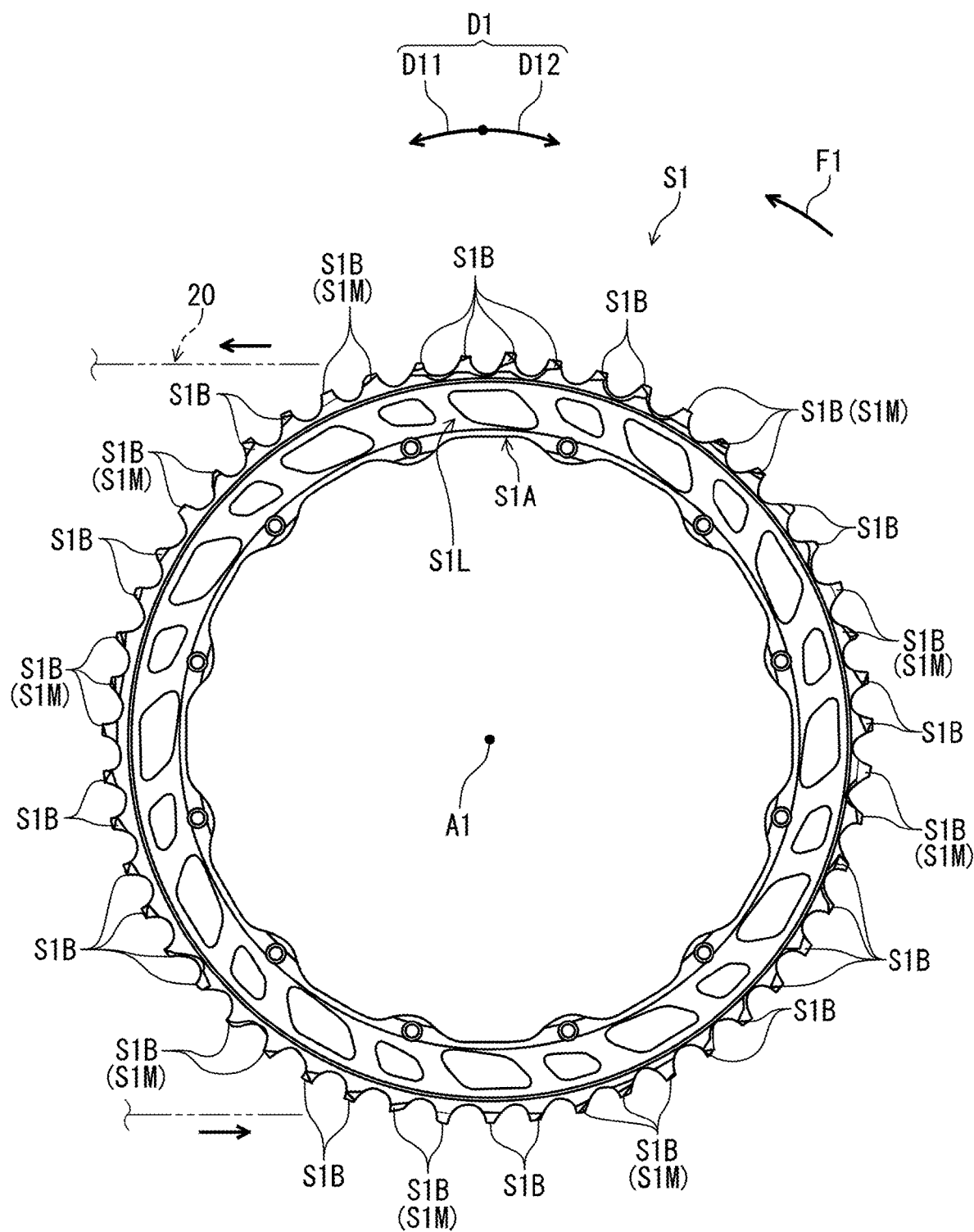
FIG. 27 is another side elevational view of the bicycle rear sprocket illustrated in FIG. 5.

As seen in FIG. 27, in the bicycle rear sprocket S1, the plurality of sprocket teeth S1B includes a plurality of chain-drop reduction teeth S1M. A total number of the plurality of chain-drop reduction teeth S1M is equal to or larger than one-third of the total tooth-space number of the plurality of sprocket teeth S1B. The total tooth-space number of the plurality of sprocket teeth S1B is equal to or larger than 21. The total tooth-space number of the plurality of sprocket teeth S1B is equal to or smaller than 58. The total number of the plurality of chain-drop reduction teeth S1M is equal to or larger than three. The total number of the plurality of chain-drop reduction teeth S1M is equal to or smaller than 55. In this embodiment, the total tooth-space number of the plurality of sprocket teeth S1B is 51. The total number of the plurality of chain-drop reduction teeth S1M is 21. However, the total tooth-space number of the plurality of sprocket teeth S1B is not limited to this embodiment and the above ranges. The total number of the plurality of chain-drop reduction teeth S1M is not limited to this embodiment and the above ranges.

Figure 28:
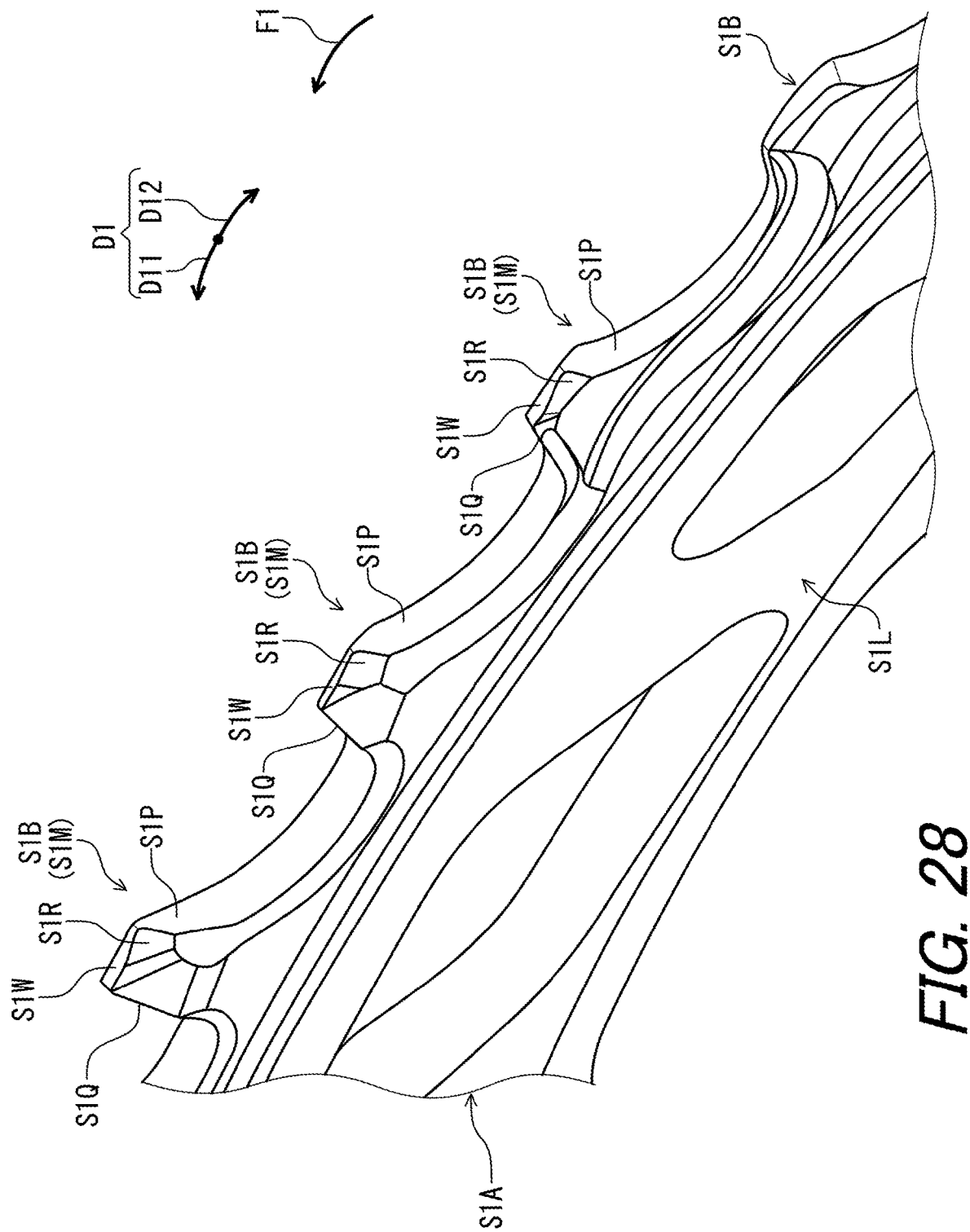
FIG. 28 is a perspective view of chain-drop reduction teeth of the bicycle rear sprocket illustrated in FIG. 27.

As seen in FIG. 28, each of the plurality of chain-drop reduction teeth S1M comprises an upstream circumferential surface S1P and a downstream circumferential surface S1Q. The downstream circumferential surface S1Q reversely faces relative to the upstream circumferential surface S1P in the circumferential direction D1 with respect to the rotational center axis A1. The downstream circumferential surface S1Q faces in the driving rotational direction D11. The upstream circumferential surface S1P faces in the reverse rotational direction D12 to receive the driving rotational force F1 from a roller of the bicycle chain 20 (see e.g., FIG. 27).

Each of the plurality of chain-drop reduction teeth S1M comprises a tooth-tip S1W and a chain-drop reduction chamfer S1R. The chain-drop reduction chamfer S1R extends from the upstream circumferential surface S1P and from the tooth-tip S1W toward at least one of the bicycle inward surface S1L and the bicycle outward surface S1K. In this embodiment, the chain-drop reduction chamfer S1R extends toward the bicycle inward surface S1L. However, the chain-drop reduction chamfer S1R can extend from the upstream circumferential surface S1P and from the tooth-tip S1W toward the bicycle outward surface S1K or toward both the bicycle inward surface S1L and the bicycle outward surface S1K.

Figure 29:
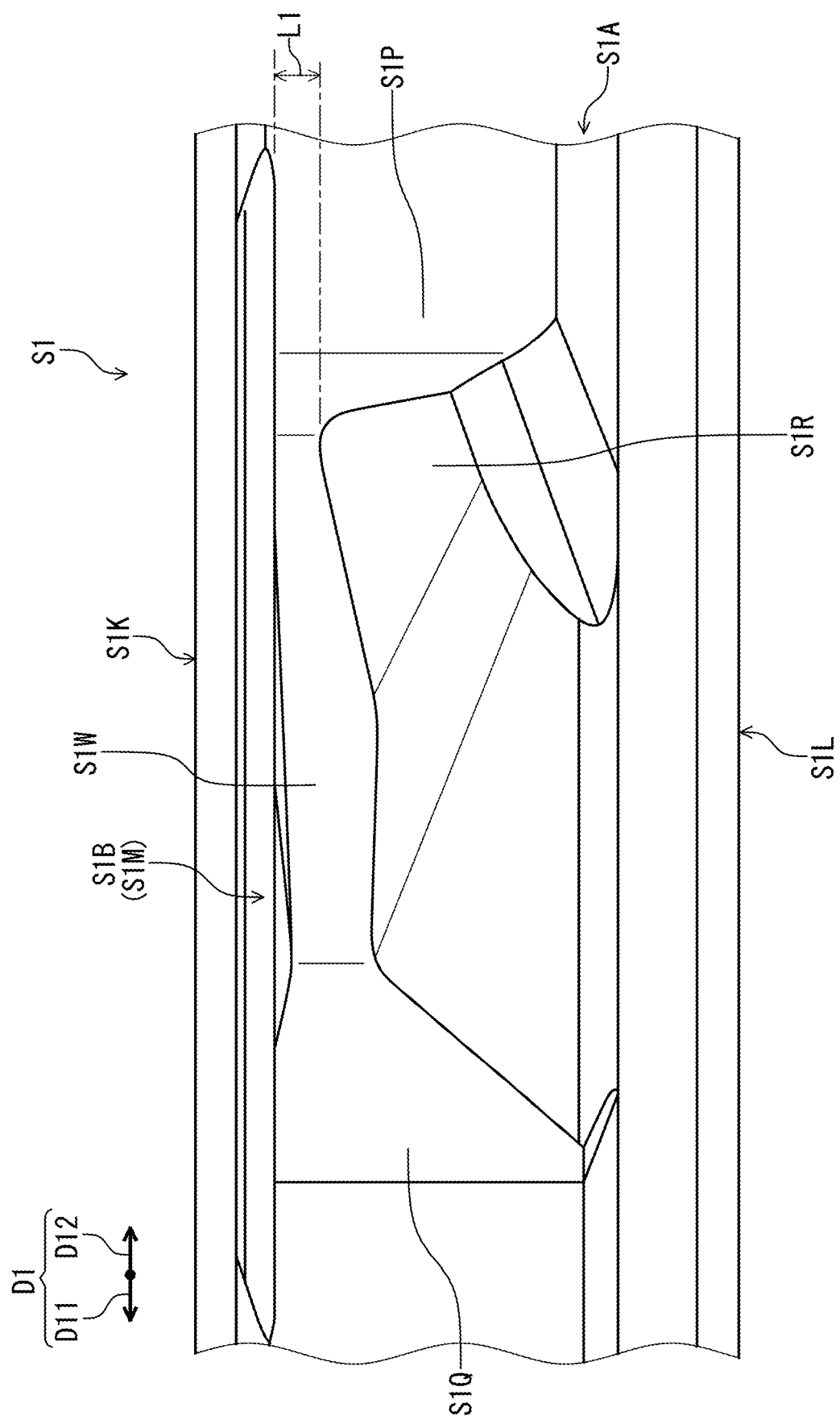
FIG. 29 is a plan view of the chain-drop reduction tooth illustrated in FIG. 28.

As seen in FIG. 29, the chain-drop reduction chamfer S1R defines a minimum tooth-tip axial length L1 that is equal to or smaller than 0.3 mm. The minimum tooth-tip axial length L1 is equal to or larger than 0.15 mm. However, the minimum tooth-tip axial length L1 is not limited to the above ranges.

As seen in FIG. 5, the plurality of sprocket teeth S1B includes at least one upshifting facilitation tooth S1BU configured to facilitate an upshifting operation in which the bicycle chain 20 is shifted from the bicycle rear sprocket S1 toward the neighboring smaller rear sprocket S2 (see e.g., FIG. 3). The at least one upshifting facilitation tooth S1BU includes at least one axially recessed tooth S1BU1. In this embodiment, the plurality of sprocket teeth S1B includes a plurality of upshifting facilitation teeth S1BU configured to facilitate the upshifting operation. The plurality of upshifting facilitation teeth S1BU includes a plurality of axially recessed teeth S1BU1 and the chain-drop reduction teeth S1M. The axially recessed tooth S1BU1 includes an upshifting facilitation recess S1BU2 provided on the bicycle outward surface S1K to reduce interference between the bicycle rear sprocket S1 and the bicycle chain 20 in the upshifting operation. In this embodiment, the chain-drop reduction tooth S1M does not include an upshifting facilitation recess. However, the chain-drop reduction tooth S1M can include an upshifting facilitation recess.

The plurality of sprocket teeth S1B includes at least one downshifting facilitation tooth S1BD configured to facilitate a downshifting operation in which the bicycle chain 20 is shifted from the neighboring smaller rear sprocket S2 (see e.g., FIG. 3) toward the bicycle rear sprocket S1. The at least one downshifting facilitation tooth S1BD includes at least one axially recessed tooth S1BD1. In this embodiment, the plurality of sprocket teeth S1B includes a plurality of downshifting facilitation teeth S1BD configured to facilitate the downshifting operation. The plurality of downshifting facilitation teeth S1BD includes a plurality of axially recessed teeth S1BD1 and the plurality of chain-drop reduction teeth S1M. The axially recessed tooth S1BD1 includes a downshifting facilitation recess S1BD2 provided on the bicycle outward surface S1K to reduce interference between the bicycle rear sprocket S1 and the bicycle chain 20 in the downshifting operation. In this embodiment, the chain-drop reduction tooth S1M does not include a downshifting facilitation recess. However, the chain-drop reduction tooth S1M can include a downshifting facilitation recess.

As seen in FIG. 1, the bicycle chain 20 is inclined relative to the center plane CP of the bicycle frame BF in a state ST1 where the bicycle chain 20 is engaged with the bicycle rear sprocket S11 or S12 to gradually decrease a distance DS between the bicycle chain 20 and the center plane CP from the bicycle rear sprocket S11 or S12 to the front sprocket 27. The bicycle chain 20 is inclined relative to the center plane CP of the bicycle frame BF in a state ST2 where the bicycle chain 20 is engaged with the bicycle rear sprocket S1 or S2 to gradually increase the distance DS between the bicycle chain 20 and the center plane CP from the bicycle rear sprocket S1 or S2 to the front sprocket 27.

Figure 30:
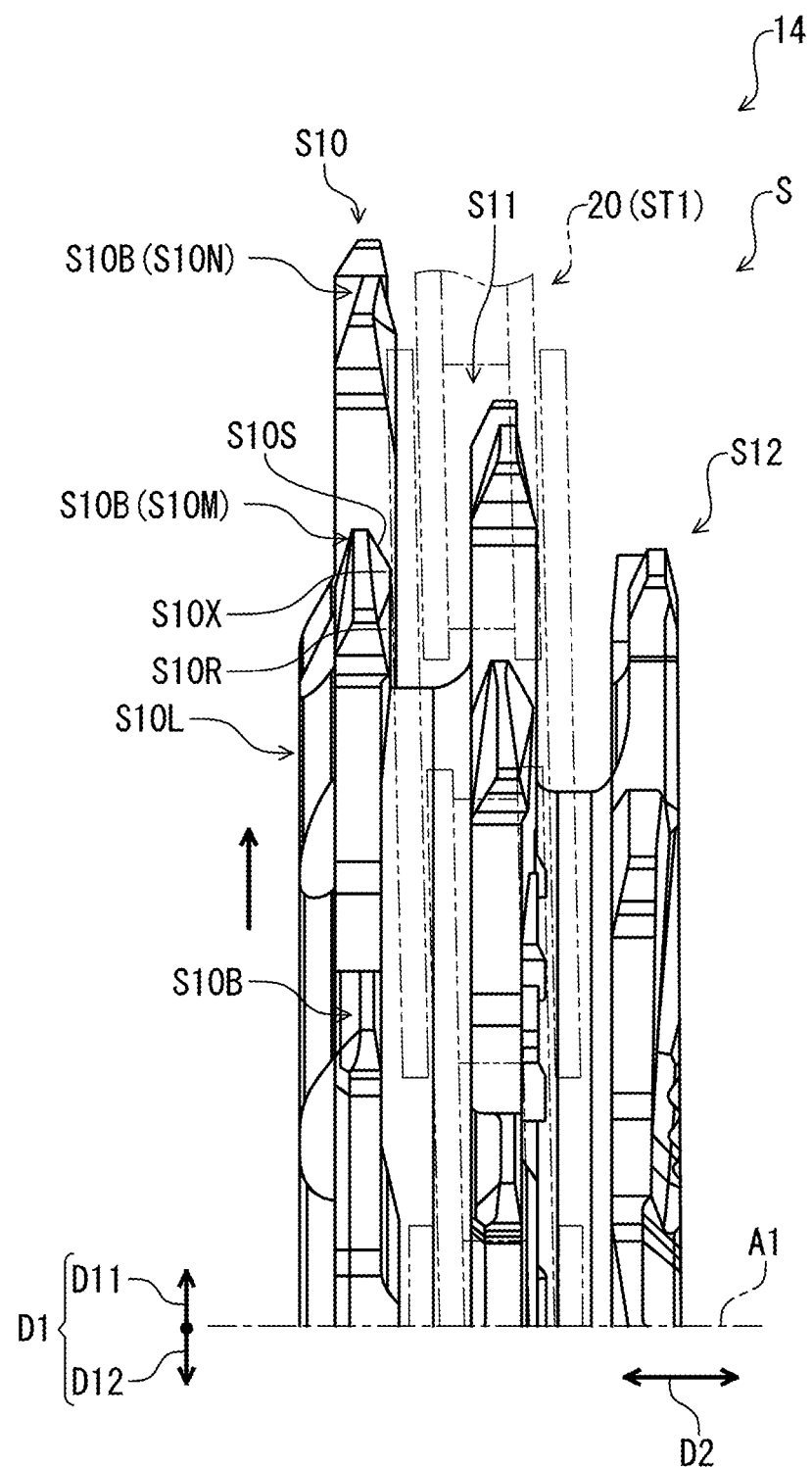
FIG. 30 is a partial top view of the bicycle rear sprockets illustrated in FIGS. 14 and 15, with a bicycle chain.

As seen in FIG. 30, in the state ST1 of the bicycle chain 20, the sprocket tooth S10B of the bicycle rear sprocket S10 can come into contact with the bicycle chain 20 while the bicycle sprocket arrangement 14 rotates in the driving rotational direction D11 during pedaling. However, at least one of the first chamfer S10R and the second chamfer S10S of the driving-noise reduction tooth S10M can reduce noise caused by a contact between the bicycle chain 20 and the bicycle rear sprocket S10. For example, the second chamfer S10S can reduce noise generated when the driving-noise reduction tooth S10M comes into contact with the bicycle chain 20 in the state ST1 of the bicycle chain 20. The first chamfer S10R can reduce noise generated when the driving-noise reduction tooth S10M gets away from the bicycle chain 20 in the state ST1 of the bicycle chain 20.

Figure 31:
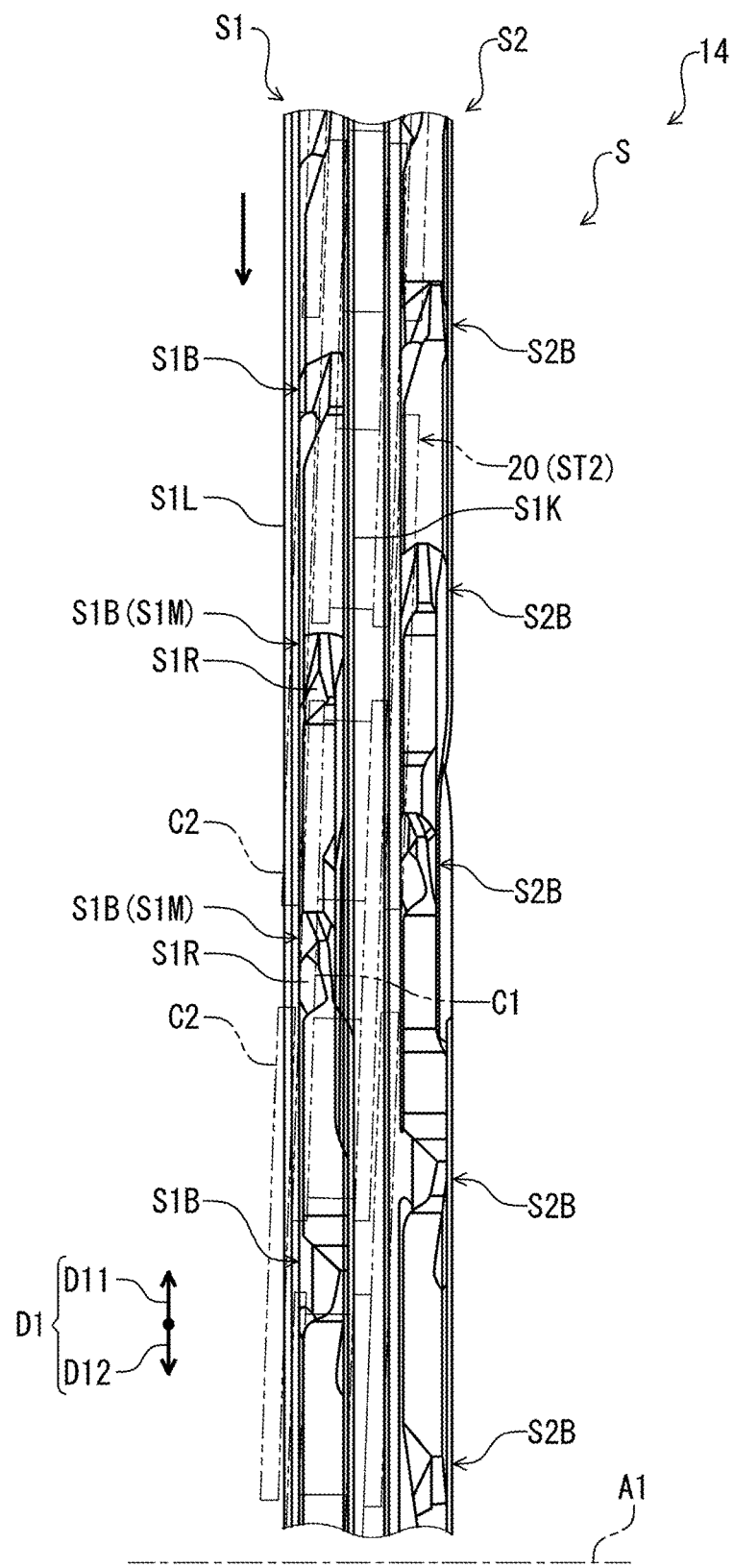
FIG. 31 is a partial top view of the bicycle rear sprockets illustrated in FIGS. 5 and 6, with the bicycle chain.

As seen in FIG. 31, in the state ST2 of the bicycle chain 20, the sprocket tooth S1B of the bicycle rear sprocket S1 can come into contact with the bicycle chain 20 while the bicycle sprocket arrangement 14 reversely rotates in the reverse rotational direction D12 during coasting. However, the chain-drop reduction chamfer S1R of the chain-drop reduction tooth 51M can guide an inner link plate C1 or an outer link plate C2 of the bicycle chain 20 toward the bicycle inward surface S1L of the bicycle rear sprocket S1 when the chain-drop reduction tooth S1M comes into engagement with the bicycle chain 20 while the bicycle sprocket arrangement 14 reversely rotates in the reverse rotational direction D12 during coasting. Thus, the chain-drop reduction chamfer S1R can reduce the chain-drop of the bicycle chain 20 from the bicycle rear sprocket S1 while the bicycle sprocket arrangement 14 reversely rotates in the reverse rotational direction D12 during coasting.

The structures of the driving-noise reduction teeth S10M, S10N and S10J of the bicycle rear sprocket S10 can apply to other bicycle rear sprockets S1 to S9, S11 and S12. The structures of the driving-noise reduction teeth S11M, S11N and S11J of the bicycle rear sprocket S11 can apply to other bicycle rear sprockets S1 to S9, S10 and S12. The structure of the chain-drop reduction tooth S1M of the bicycle rear sprocket S1 can apply to other bicycle rear sprockets S2 to S12.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket comprising:
a sprocket body; and
a plurality of sprocket teeth extending radially outwardly from the sprocket body with respect to a rotational center axis of the bicycle rear sprocket, the sprocket body and the plurality of sprocket teeth defining a bicycle outward surface and a bicycle inward surface reversely facing relative to the bicycle outward surface in an axial direction with respect to the rotational center axis, the bicycle inward surface being configured to face toward a center plane of a bicycle frame in a mounting state where the bicycle rear sprocket is mounted to the bicycle frame, the plurality of sprocket teeth including a plurality of driving-noise reduction teeth,
each of the plurality of driving-noise reduction teeth comprising:
an upstream circumferential surface;
a downstream circumferential surface reversely facing relative to the upstream circumferential surface in a circumferential direction with respect to the rotational center axis;
a first chamfer extending from the upstream circumferential surface toward the bicycle outward surface, the first chamfer having a first borderline relative to the bicycle outward surface, the first borderline having a first end disposed on the upstream circumferential surface and a first opposite end opposite to the first end; and
a second chamfer extending from the downstream circumferential surface toward the bicycle outward surface, the second chamfer having a second borderline relative to the bicycle outward surface, the second borderline having a second end disposed on the downstream circumferential surface and a second opposite end opposite to the second end,
the first opposite end of the first borderline and the second opposite end of the second borderline being disposed radially outwardly from each of the first end of the first borderline and the second end of the second borderline with respect to the rotational center axis, and
a total number of the plurality of driving-noise reduction teeth being equal to or larger than one-third of a total tooth-space number of the plurality of sprocket teeth.

2. The bicycle rear sprocket according to claim 1, wherein the total tooth-space number of the plurality of sprocket teeth ranges from 9 to 18.

3. The bicycle rear sprocket according to claim 1, wherein the total number of the plurality of driving-noise reduction teeth is equal to or larger than three.

4. The bicycle rear sprocket according to claim 1, wherein the total number of the plurality of driving-noise reduction teeth is equal to or smaller than 16.

5. The bicycle rear sprocket according to claim 1, wherein the plurality of sprocket teeth includes at least one upshifting facilitation tooth configured to facilitate an upshifting operation in which a bicycle chain is shifted from the bicycle rear sprocket toward a neighboring smaller rear sprocket.

6. The bicycle rear sprocket according to claim 5, wherein the at least one upshifting facilitation tooth includes at least one axially recessed tooth.

7. The bicycle rear sprocket according to claim 1, wherein the plurality of sprocket teeth includes at least one downshifting facilitation tooth configured to facilitate a downshifting operation in which a bicycle chain is shifted from a neighboring smaller rear sprocket toward the bicycle rear sprocket.

8. The bicycle rear sprocket according to claim 7, wherein the at least one downshifting facilitation tooth includes at least one axially recessed tooth.

9. A bicycle rear sprocket comprising:
a sprocket body; and
a plurality of sprocket teeth extending radially outwardly from the sprocket body with respect to a rotational center axis of the bicycle rear sprocket, the sprocket body and the plurality of sprocket teeth defining a bicycle outward surface and a bicycle inward surface reversely facing relative to the bicycle outward surface in an axial direction with respect to the rotational center axis, the bicycle inward surface being configured to face toward a center plane of a bicycle frame in a mounting state where the bicycle rear sprocket is mounted to the bicycle frame, the plurality of sprocket teeth including a plurality of chain-drop reduction teeth,
each of the plurality of chain-drop reduction teeth comprising:
an upstream circumferential surface;
a downstream circumferential surface reversely facing relative to the upstream circumferential surface in a circumferential direction with respect to the rotational center axis;
a tooth-tip; and
a chain-drop reduction chamfer extending from the upstream circumferential surface and from the tooth-tip toward at least one of the bicycle inward surface and the bicycle outward surface,
the chain-drop reduction chamfer defining a minimum tooth-tip axial length that is equal to or smaller than 0.3 mm, and
a total number of the plurality of chain-drop reduction teeth being equal to or larger than one-third of a total tooth-space number of the plurality of sprocket teeth.

10. The bicycle rear sprocket according to claim 9, wherein the chain-drop reduction chamfer extends toward the bicycle inward surface.

11. The bicycle rear sprocket according to claim 9, wherein the total tooth-space number of the plurality of sprocket teeth is equal to or larger than 21.

12. The bicycle rear sprocket according to claim 9, wherein the total tooth-space number of the plurality of sprocket teeth is equal to or smaller than 58.

13. The bicycle rear sprocket according to claim 9, wherein the total number of the plurality of chain-drop reduction teeth is equal to or larger than three.

14. The bicycle rear sprocket according to claim 9, wherein
the total number of the plurality of chain-drop reduction teeth is equal to or smaller than 55.

15. The bicycle rear sprocket according to claim 9, wherein
the minimum tooth-tip axial length is equal to or larger than 0.15 mm.

16. The bicycle rear sprocket according to claim 9, wherein
the plurality of sprocket teeth includes at least one upshifting facilitation tooth configured to facilitate an upshifting operation in which a bicycle chain is shifted from the bicycle rear sprocket toward a neighboring smaller rear sprocket.

17. The bicycle rear sprocket according to claim 16, wherein
the at least one upshifting facilitation tooth includes at least one axially recessed tooth.

18. The bicycle rear sprocket according to claim 9, wherein
the plurality of sprocket teeth includes at least one downshifting facilitation tooth configured to facilitate a downshifting operation in which a bicycle chain is shifted from a neighboring smaller rear sprocket toward the bicycle rear sprocket.

19. The bicycle rear sprocket according to claim 18, wherein
the at least one downshifting facilitation tooth includes at least one axially recessed tooth.

* * * * *